(12) United States Patent
Tsujita

(10) Patent No.: US 12,724,371 B2
(45) Date of Patent: Sep. 1, 2026

(54) INSPECTION APPARATUS, INSPECTION METHOD, AND IMAGE FORMING APPARATUS

(71) Applicant: CANON KABUSHIKI KAISHA, Tokyo (JP)

(72) Inventor: Kosuke Tsujita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/980,615

(22) Filed: Dec. 13, 2024

(65) Prior Publication Data

US 2025/0251683 A1 Aug. 7, 2025

(30) Foreign Application Priority Data

Feb. 7, 2024 (JP) ................................ 2024-017436

(51) Int. Cl.

*G03G 15/00* (2006.01)
*G06F 3/12* (2006.01)
*H04N 1/00* (2006.01)

(52) U.S. Cl.

CPC ..... *G03G 15/5029* (2013.01); *G03G 15/5016* (2013.01); *G06F 3/1204* (2013.01); *G06F 3/1208* (2013.01); *G06F 3/1256* (2013.01); *H04N 1/00031* (2013.01); *H04N 1/00087* (2013.01); *H04N 1/00206* (2013.01); *H04N 1/00244* (2013.01); *G03G 2215/00616* (2013.01); *G03G 2215/00742* (2013.01); *H04N 2201/0094* (2013.01)

(58) Field of Classification Search

CPC ............ G03G 15/5016; G03G 15/5029; G06F 3/1204; G06F 3/1208; G06F 3/1256; H04N 1/00031; H04N 1/00087; H04N 1/00206
USPC ........................... 399/45; 358/1.11, 406, 504
See application file for complete search history.

(56) References Cited

U.S. PATENT DOCUMENTS

| | | | | |
|---|---|---|---|---|
| 12,107,996 | B2 * | 10/2024 | Kobayashi | G06T 7/001 |
| 12,519,894 | B2 * | 1/2026 | Suda | H04N 1/00087 |
| 2023/0328186 | A1 | 10/2023 | Azuma | |

FOREIGN PATENT DOCUMENTS

| | | | |
|---|---|---|---|
| CN | 116909498 | * | 10/2023 |
| CN | 117092106 | * | 11/2023 |
| JP | 2023155532 A | | 10/2023 |

* cited by examiner

*Primary Examiner* — Hoan H Tran
(74) *Attorney, Agent, or Firm* — ROSSI, KIMMS & McDOWELL LLP

(57) ABSTRACT

An inspection apparatus detects a defect of an image formed by scanning a sheet with an image formed thereon conveyed from an image forming unit, wherein the detecting the defect is to detect a defect at an inspection level decided based on sheet management information for linking an inspection level with sheet information and sheet information of the sheet with the image formed thereon.

15 Claims, 25 Drawing Sheets

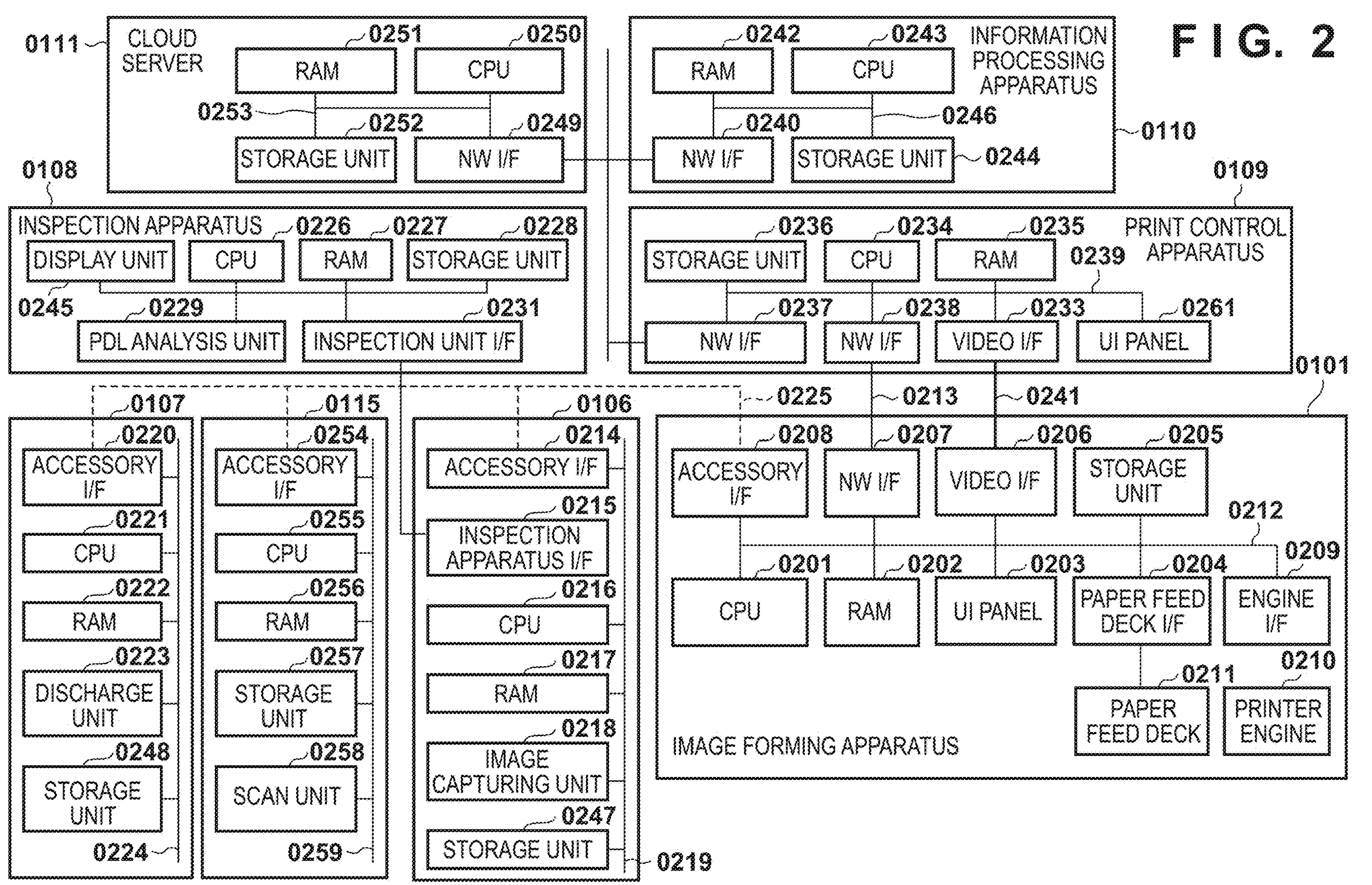
FIG. 2
0111
CLOUD SERVER
0251
RAM
0250
CPU
0253
0252
STORAGE UNIT
0249
NW I/F
0242
RAM
0243
CPU
INFORMATION PROCESSING APPARATUS
0240
0246
NW I/F
STORAGE UNIT
0244
0110
0108
INSPECTION APPARATUS
0226
0227
0228
DISPLAY UNIT
CPU
RAM
STORAGE UNIT
0245
0229
0231
PDL ANALYSIS UNIT
INSPECTION UNIT I/F
0109
0236
0234
0235
PRINT CONTROL APPARATUS
STORAGE UNIT
CPU
RAM
0239
0237
0238
0233
0261
NW I/F
NW I/F
VIDEO I/F
UI PANEL
0101
0107
0115
0106
0225
0213
0241
0220
ACCESSORY I/F
0221
CPU
0222
RAM
0223
DISCHARGE UNIT
0248
STORAGE UNIT
0224
0254
ACCESSORY I/F
0255
CPU
0256
RAM
0257
STORAGE UNIT
0258
SCAN UNIT
0259
0214
ACCESSORY I/F
0215
INSPECTION APPARATUS I/F
0216
CPU
0217
RAM
0218
IMAGE CAPTURING UNIT
0247
STORAGE UNIT
0219
0208
ACCESSORY I/F
0207
NW I/F
0206
VIDEO I/F
0205
STORAGE UNIT
0212
0201
CPU
0202
RAM
0203
UI PANEL
0204
PAPER FEED DECK I/F
0209
ENGINE I/F
0211
PAPER FEED DECK
0210
PRINTER ENGINE
IMAGE FORMING APPARATUS 0101
0102
0103
0104
0106
0107
0115
0301
0302
0303
0304
0305
0306
0307
0308
0309
0310
0311
0312
0313
0314
0315
0316
0317
0318
0319
0320
0321
0322
0323
0324
0325
0326
0327

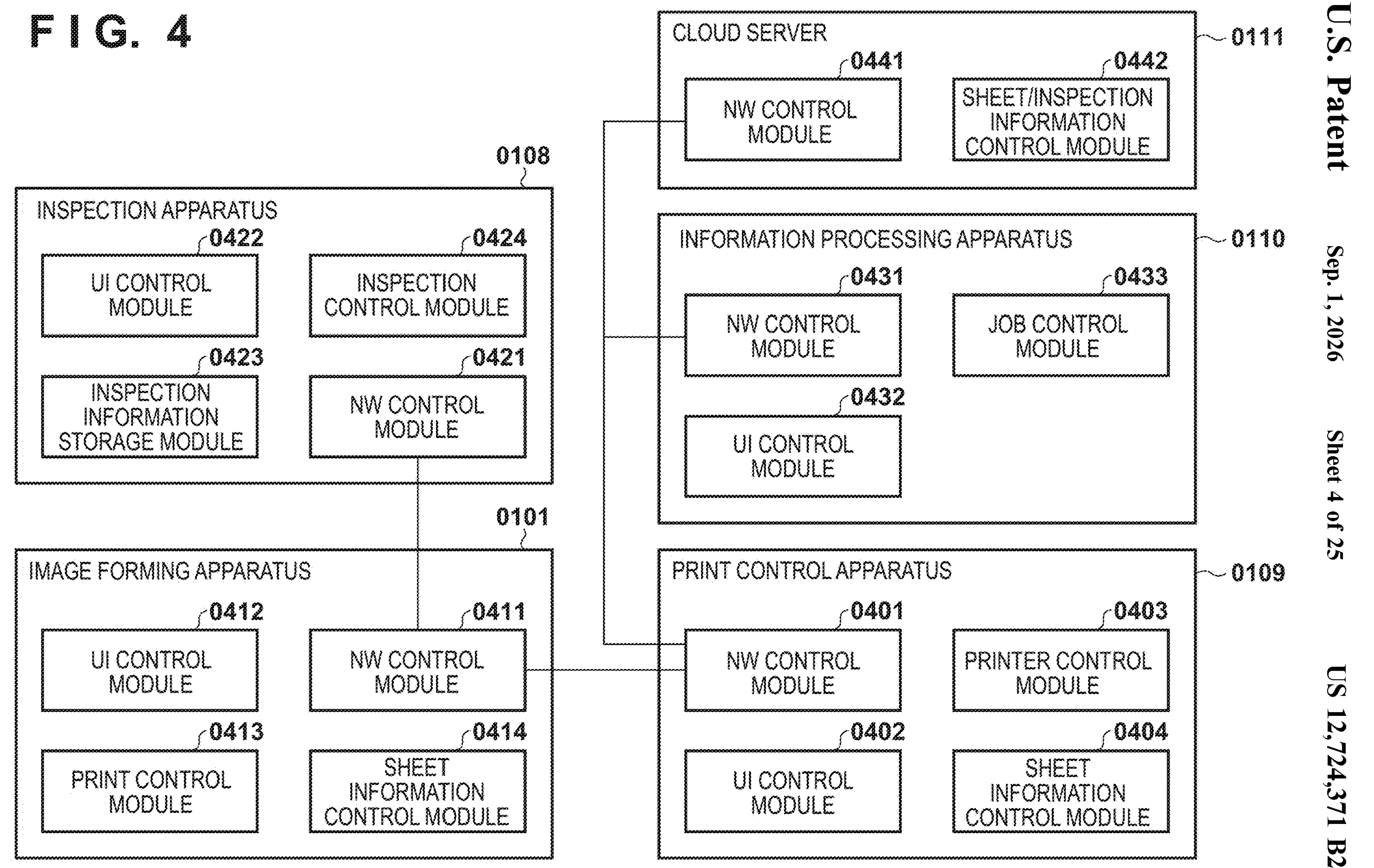
FIG. 4
INSPECTION APPARATUS
0108
UI CONTROL MODULE
0422
INSPECTION CONTROL MODULE
0424
INSPECTION INFORMATION STORAGE MODULE
0423
NW CONTROL MODULE
0421
IMAGE FORMING APPARATUS
0101
UI CONTROL MODULE
0412
NW CONTROL MODULE
0411
PRINT CONTROL MODULE
0413
SHEET INFORMATION CONTROL MODULE
0414
CLOUD SERVER
0111
NW CONTROL MODULE
0441
SHEET/INSPECTION INFORMATION CONTROL MODULE
0442
INFORMATION PROCESSING APPARATUS
0110
NW CONTROL MODULE
0431
JOB CONTROL MODULE
0433
UI CONTROL MODULE
0432
PRINT CONTROL APPARATUS
0109
NW CONTROL MODULE
0401
PRINTER CONTROL MODULE
0403
UI CONTROL MODULE
0402
SHEET INFORMATION CONTROL MODULE
0404

FIG. 5

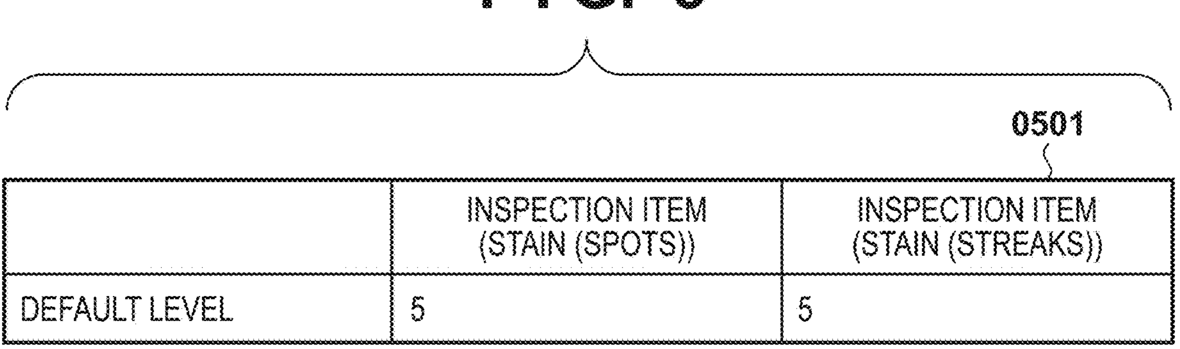

0501

| | INSPECTION ITEM (STAIN (SPOTS)) | INSPECTION ITEM (STAIN (STREAKS)) |
|---|---|---|
| DEFAULT LEVEL | 5 | 5 |

0502

| SHEET TYPE (SURFACE PROPERTY) | INSPECTION ITEM (STAIN (SPOTS)) | INSPECTION ITEM (STAIN (STREAKS)) |
|---|---|---|
| RECYCLED PAPER | 0 | -1 |
| EMBOSSED PAPER | -2 | -2 |
| SINGLE SIDE COATED (COATED SIDE) | +1 | +1 |
| SINGLE SIDE COATED (UNCOATED SIDE) | 0 | 0 |

0503

| SHEET TYPE (BASIS WEIGHT (gsm)) | INSPECTION ITEM (STAIN (SPOTS)) | INSPECTION ITEM (STAIN (STREAKS)) |
|---|---|---|
| 351 TO 400 | +2 | +2 |
| 326 TO 350 | +2 | +2 |
| 301 TO 325 | +2 | +2 |
| 257 TO 300 | +1 | +1 |

F I G. 6
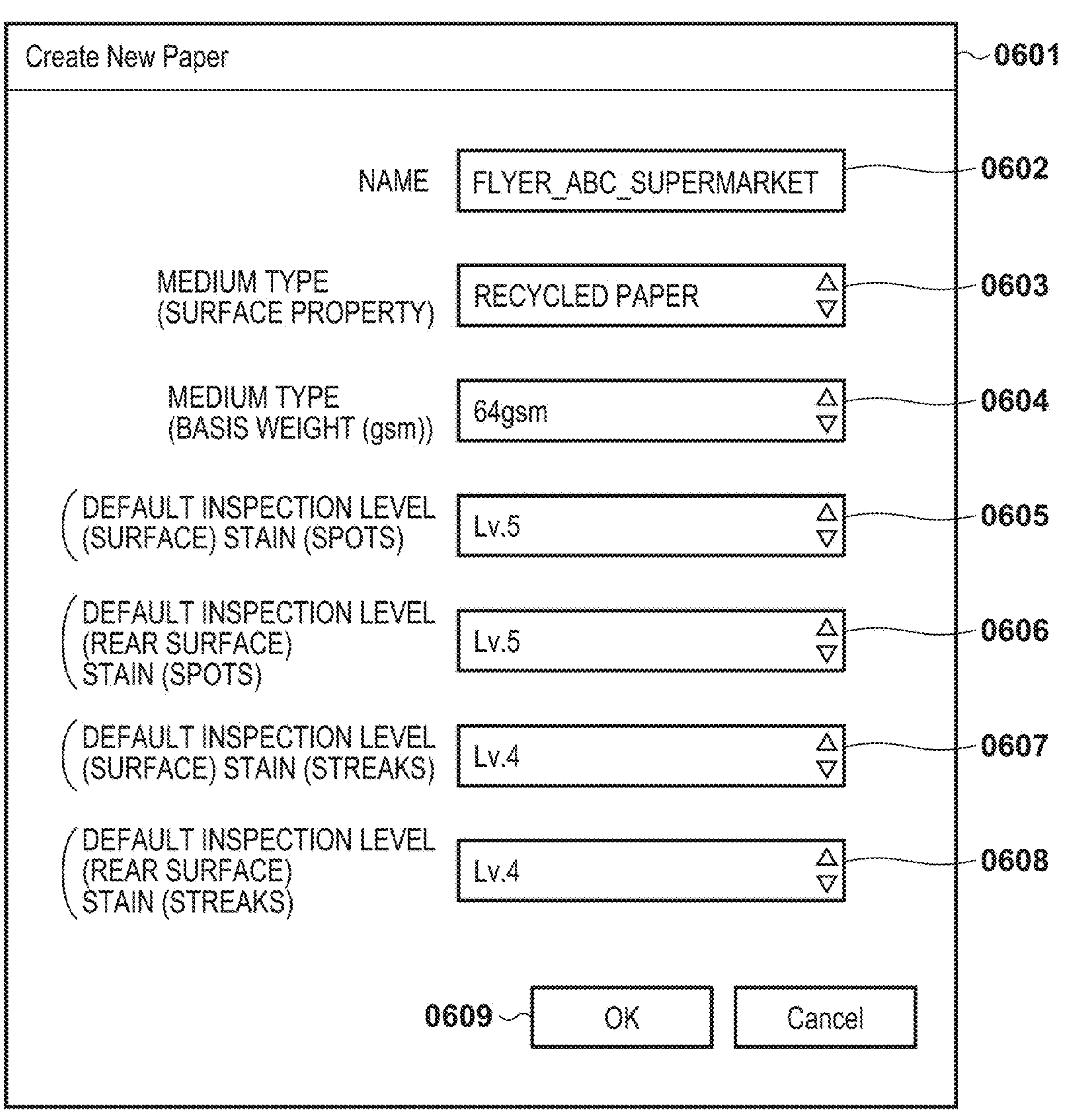

| SHEET ID | SHEET NAME | MEDIUM TYPE (SURFACE PROPERTY) | MEDIUM TYPE (BASIS WEIGHT(gsm)) | INSPECTION LEVEL | | | | EXAMINATION HISTORY |
|---|---|---|---|---|---|---|---|---|
| | | | | SURFACE | SURFACE | REAR SURFACE | REAR SURFACE | |
| | | | | INSPECTION ITEM(STAIN (SPOTS)) | INSPECTION ITEM(STAIN (STREAKS)) | INSPECTION ITEM(STAIN (SPOTS)) | INSPECTION ITEM(STAIN (STREAKS)) | |
| 0001 | FLYER_ ABC_SUPERMARKET | RECYCLED PAPER | 64 | 5 | 4 | 5 | 4 | - |
| 0002 | EV_Car_Catalog (FOR FRONT COVER) | DOUBLE-SIDE COATED 9 | 400 | 7 | 7 | 7 | 7 | - |
| 0003 | EV_Car_Catalog (FOR BODY) | DOUBLE-SIDE COATED 8 | 350 | 6 | 6 | 6 | 6 | - |
| 0004 | AAA_COMPANY_ POSTER_20230824 | SINGLE SIDE COATED 8 | 300 | 7 | 7 | 5 | 5 | 2023/08/30 |
| 0005 | AAA_COMPANY_ POSTER_20231124 | SINGLE SIDE COATED 8 | 300 | 7 | 7 | 5 | 5 | - |
| 0006 | FLYER_ XYZ_SUPER MARKET | RECYCLED PAPER | 64 | 5 | 4 | 5 | 4 | - |

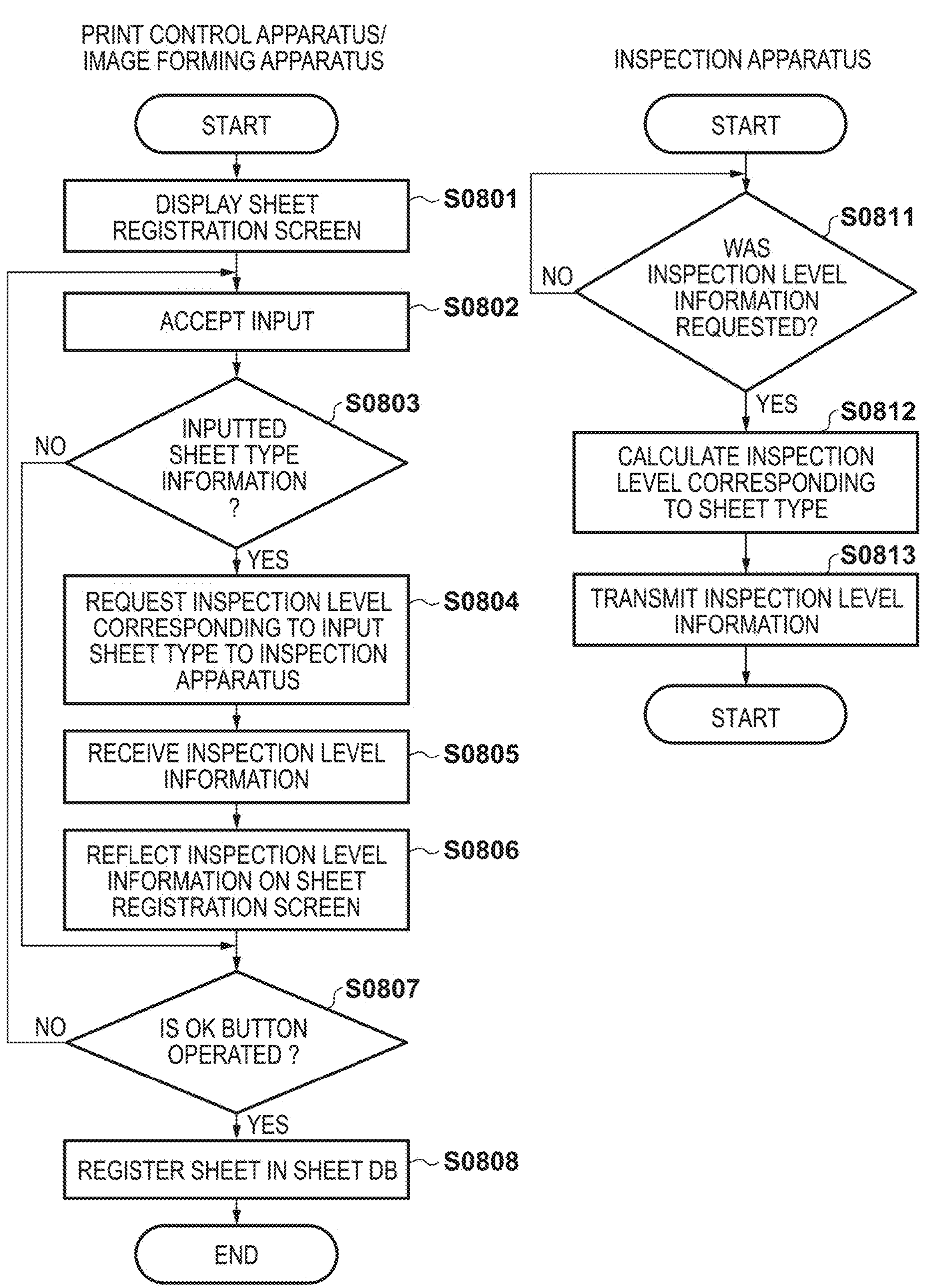

FIG. 8A
PRINT CONTROL APPARATUS/ IMAGE FORMING APPARATUS
START
DISPLAY SHEET REGISTRATION SCREEN
S0801
ACCEPT INPUT
S0802
INPUTTED SHEET TYPE INFORMATION ?
S0803
NO
YES
REQUEST INSPECTION LEVEL CORRESPONDING TO INPUT SHEET TYPE TO INSPECTION APPARATUS
S0804
RECEIVE INSPECTION LEVEL INFORMATION
S0805
REFLECT INSPECTION LEVEL INFORMATION ON SHEET REGISTRATION SCREEN
S0806
IS OK BUTTON OPERATED ?
S0807
NO
YES
REGISTER SHEET IN SHEET DB
S0808
END
FIG. 8B
INSPECTION APPARATUS
START
WAS INSPECTION LEVEL INFORMATION REQUESTED?
S0811
NO
YES
CALCULATE INSPECTION LEVEL CORRESPONDING TO SHEET TYPE
S0812
TRANSMIT INSPECTION LEVEL INFORMATION
S0813
START

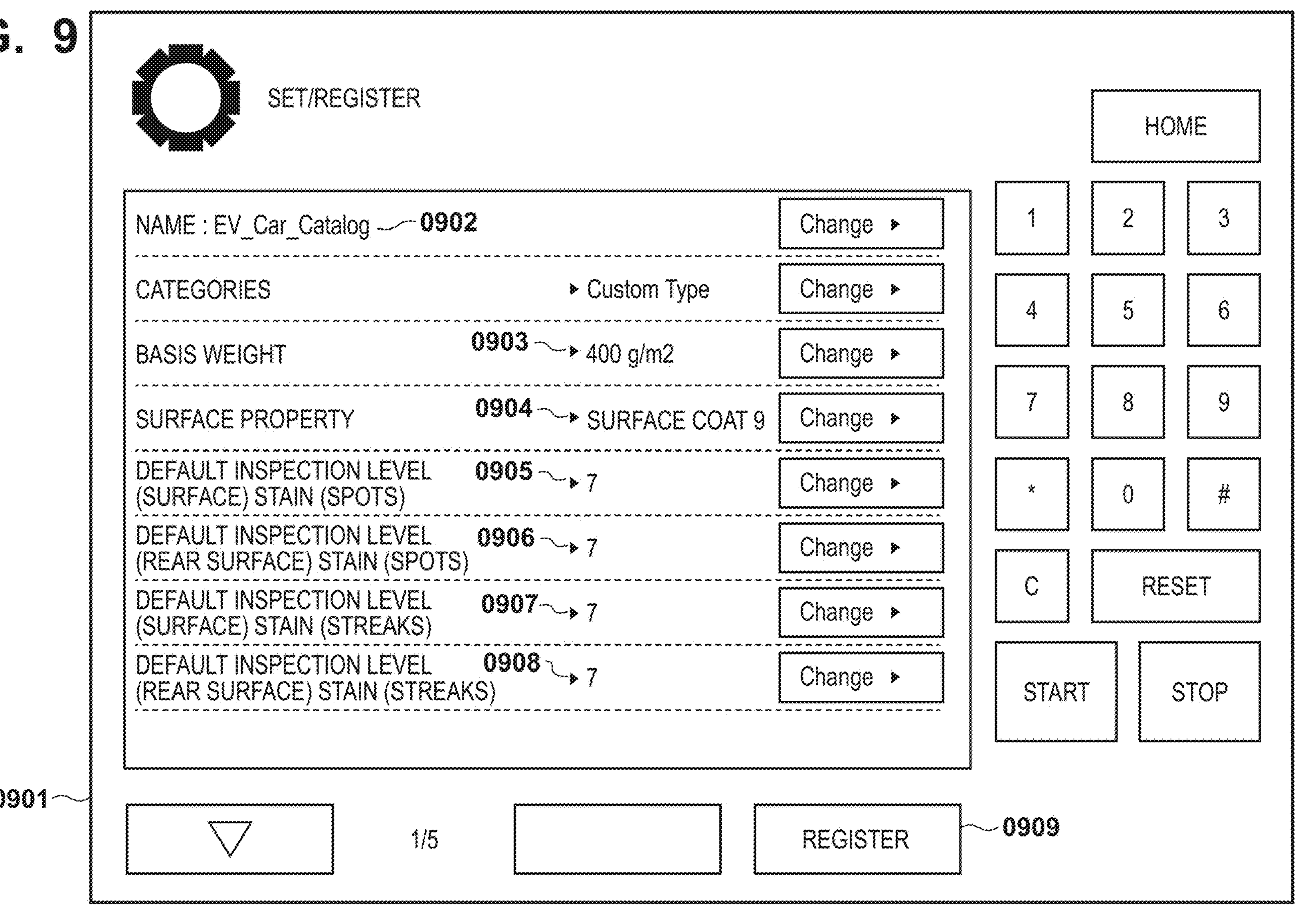
FIG. 9
SET/REGISTER
NAME : EV_Car_Catalog
0902
Change
CATEGORIES
Custom Type
Change
BASIS WEIGHT
0903
400 g/m2
Change
SURFACE PROPERTY
0904
SURFACE COAT 9
Change
DEFAULT INSPECTION LEVEL (SURFACE) STAIN (SPOTS)
0905
7
Change
DEFAULT INSPECTION LEVEL (REAR SURFACE) STAIN (SPOTS)
0906
7
Change
DEFAULT INSPECTION LEVEL (SURFACE) STAIN (STREAKS)
0907
7
Change
DEFAULT INSPECTION LEVEL (REAR SURFACE) STAIN (STREAKS)
0908
7
Change
1/5
REGISTER
0909
HOME
1
2
3
4
5
6
7
8
9
*
0

C
RESET
START
STOP
0901

1311

| INSPECTION NG | RECOVERY PROCESSING |
|---|---|
| POSITIONAL DEVIATION (VERTICAL) | REGISTRATION ADJUSTMENT |
| POSITIONAL DEVIATION (HORIZONTAL) | REGISTRATION ADJUSTMENT |
| STAIN (STREAK) | ENGINE CALIBRATION, DFE CALIBRATION |

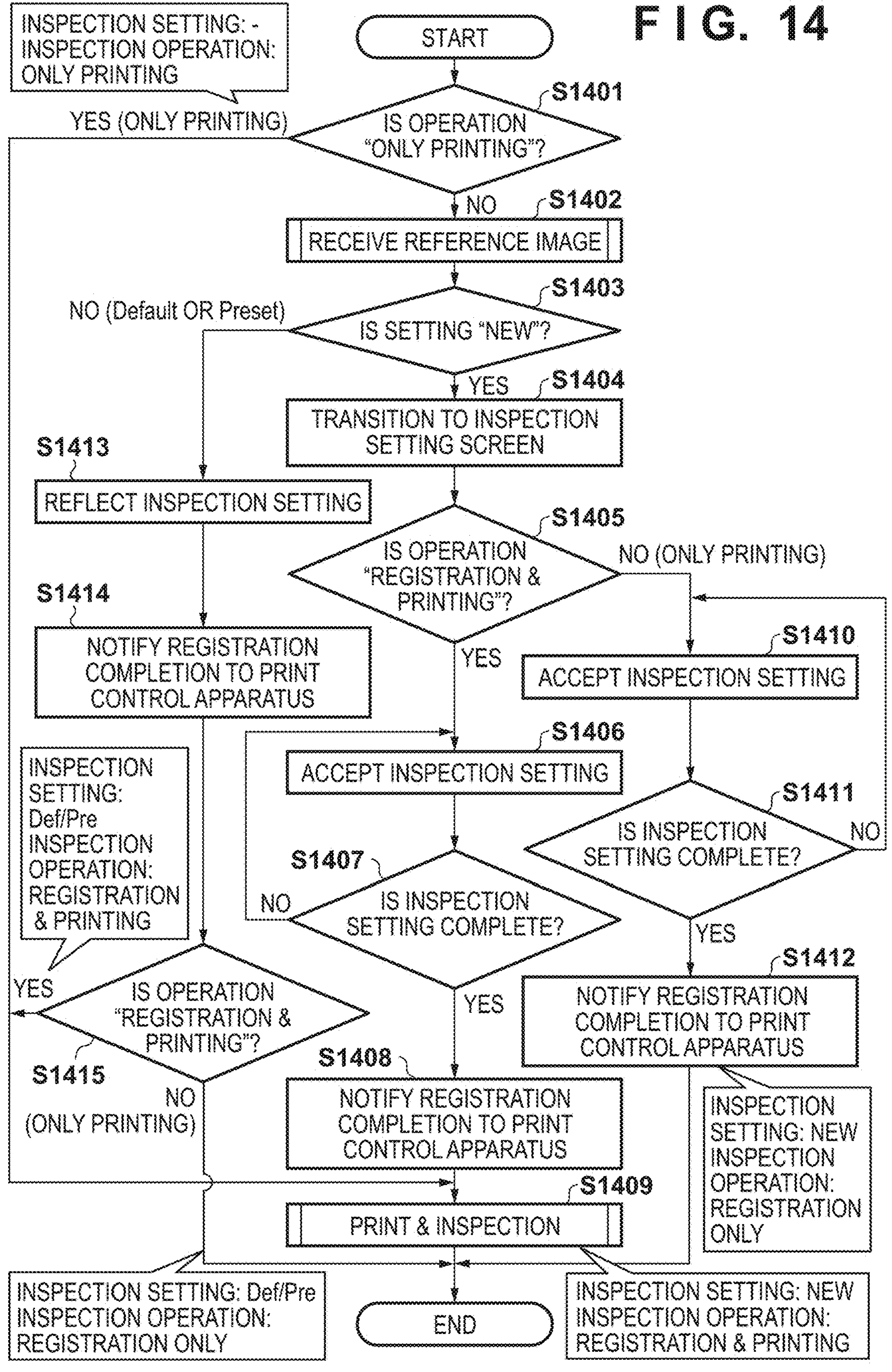

FIG. 14
INSPECTION SETTING: -
INSPECTION OPERATION: ONLY PRINTING
START
S1401
IS OPERATION "ONLY PRINTING"?
YES (ONLY PRINTING)
NO
S1402
RECEIVE REFERENCE IMAGE
S1403
IS SETTING "NEW"?
NO (Default OR Preset)
YES
S1404
TRANSITION TO INSPECTION SETTING SCREEN
S1413
REFLECT INSPECTION SETTING
S1405
IS OPERATION "REGISTRATION & PRINTING"?
NO (ONLY PRINTING)
YES
S1414
NOTIFY REGISTRATION COMPLETION TO PRINT CONTROL APPARATUS
S1410
ACCEPT INSPECTION SETTING
S1406
ACCEPT INSPECTION SETTING
INSPECTION SETTING: Def/Pre
INSPECTION OPERATION: REGISTRATION & PRINTING
S1411
IS INSPECTION SETTING COMPLETE?
NO
S1407
IS INSPECTION SETTING COMPLETE?
NO
YES
S1412
NOTIFY REGISTRATION COMPLETION TO PRINT CONTROL APPARATUS
YES
IS OPERATION "REGISTRATION & PRINTING"?
S1415
NO (ONLY PRINTING)
YES
S1408
NOTIFY REGISTRATION COMPLETION TO PRINT CONTROL APPARATUS
INSPECTION SETTING: NEW
INSPECTION OPERATION: REGISTRATION ONLY
S1409
PRINT & INSPECTION
INSPECTION SETTING: Def/Pre
INSPECTION OPERATION: REGISTRATION ONLY
END
INSPECTION SETTING: NEW
INSPECTION OPERATION: REGISTRATION & PRINTING F I G. 15
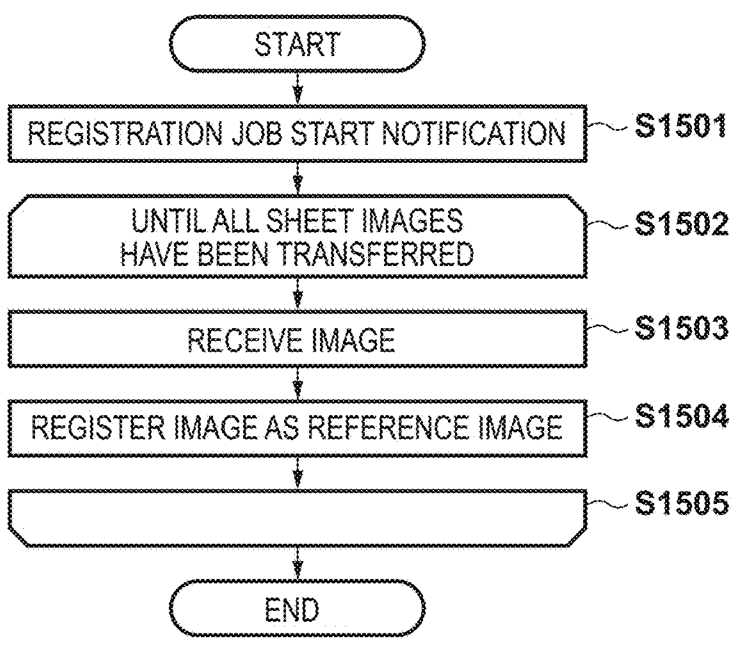
F I G. 16A
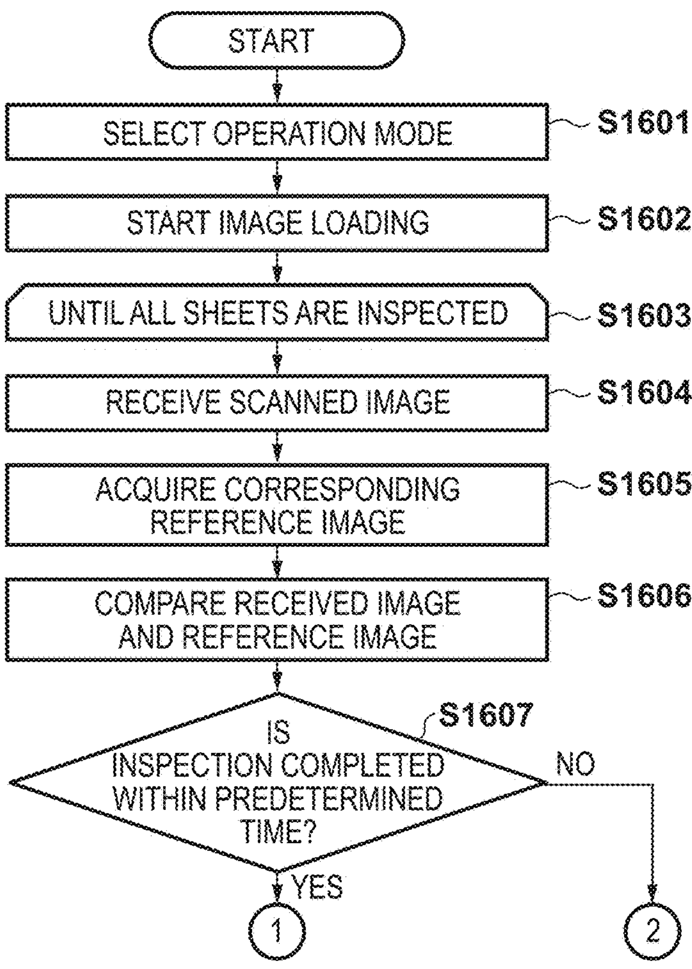

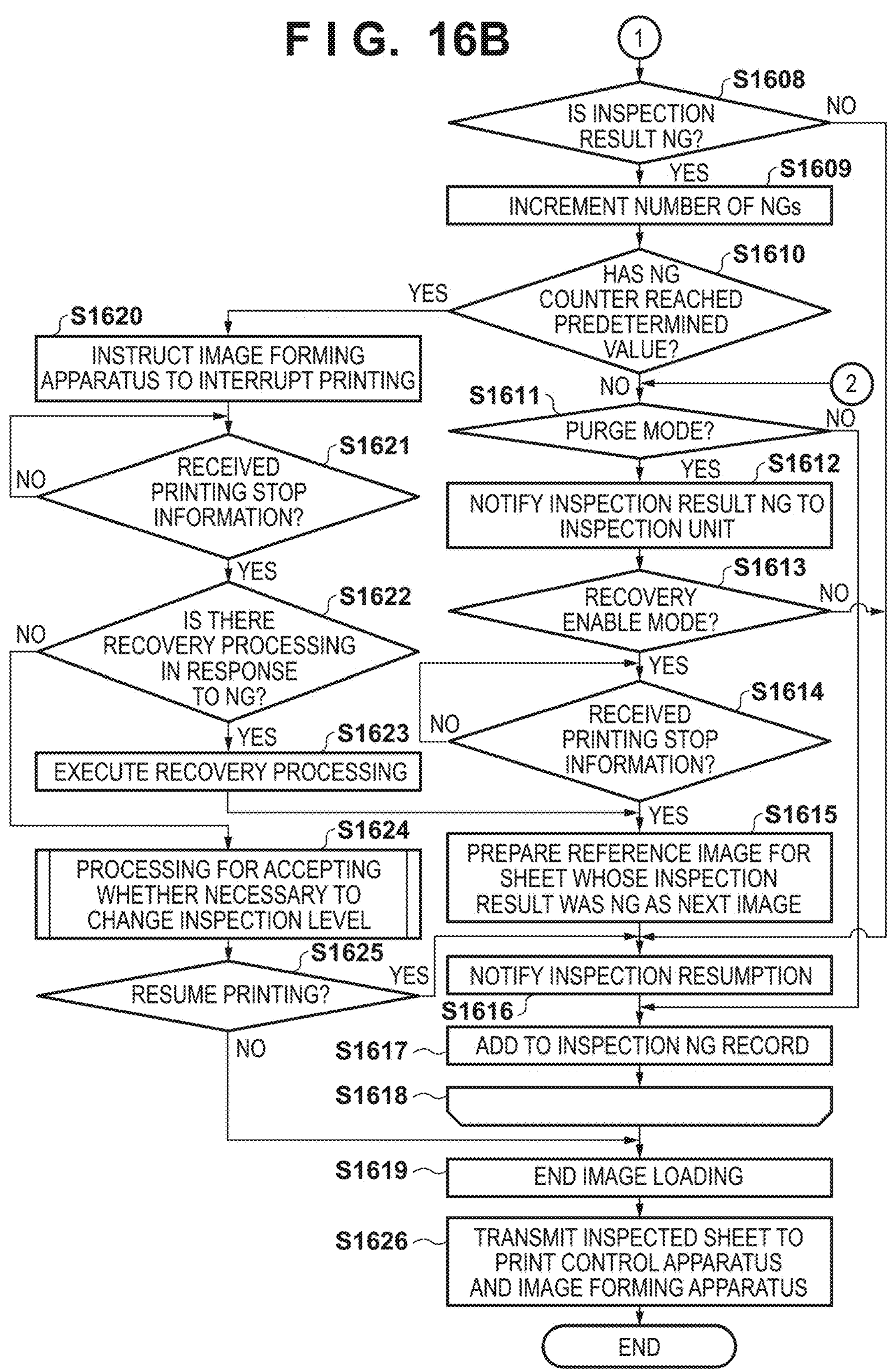
F I G. 16B
1
S1608
IS INSPECTION RESULT NG?
NO
YES
S1609
INCREMENT NUMBER OF NGs
S1610
HAS NG COUNTER REACHED PREDETERMINED VALUE?
YES
S1620
INSTRUCT IMAGE FORMING APPARATUS TO INTERRUPT PRINTING
NO
2
S1611
PURGE MODE?
NO
YES
S1612
NOTIFY INSPECTION RESULT NG TO INSPECTION UNIT
S1621
RECEIVED PRINTING STOP INFORMATION?
NO
YES
S1613
RECOVERY ENABLE MODE?
NO
YES
S1622
IS THERE RECOVERY PROCESSING IN RESPONSE TO NG?
NO
YES
S1614
RECEIVED PRINTING STOP INFORMATION?
NO
YES
S1623
EXECUTE RECOVERY PROCESSING
S1615
PREPARE REFERENCE IMAGE FOR SHEET WHOSE INSPECTION RESULT WAS NG AS NEXT IMAGE
S1624
PROCESSING FOR ACCEPTING WHETHER NECESSARY TO CHANGE INSPECTION LEVEL
S1625
RESUME PRINTING?
YES
NOTIFY INSPECTION RESUMPTION
S1616
NO
S1617
ADD TO INSPECTION NG RECORD
S1618
S1619
END IMAGE LOADING
S1626
TRANSMIT INSPECTED SHEET TO PRINT CONTROL APPARATUS AND IMAGE FORMING APPARATUS
END F I G. 17A
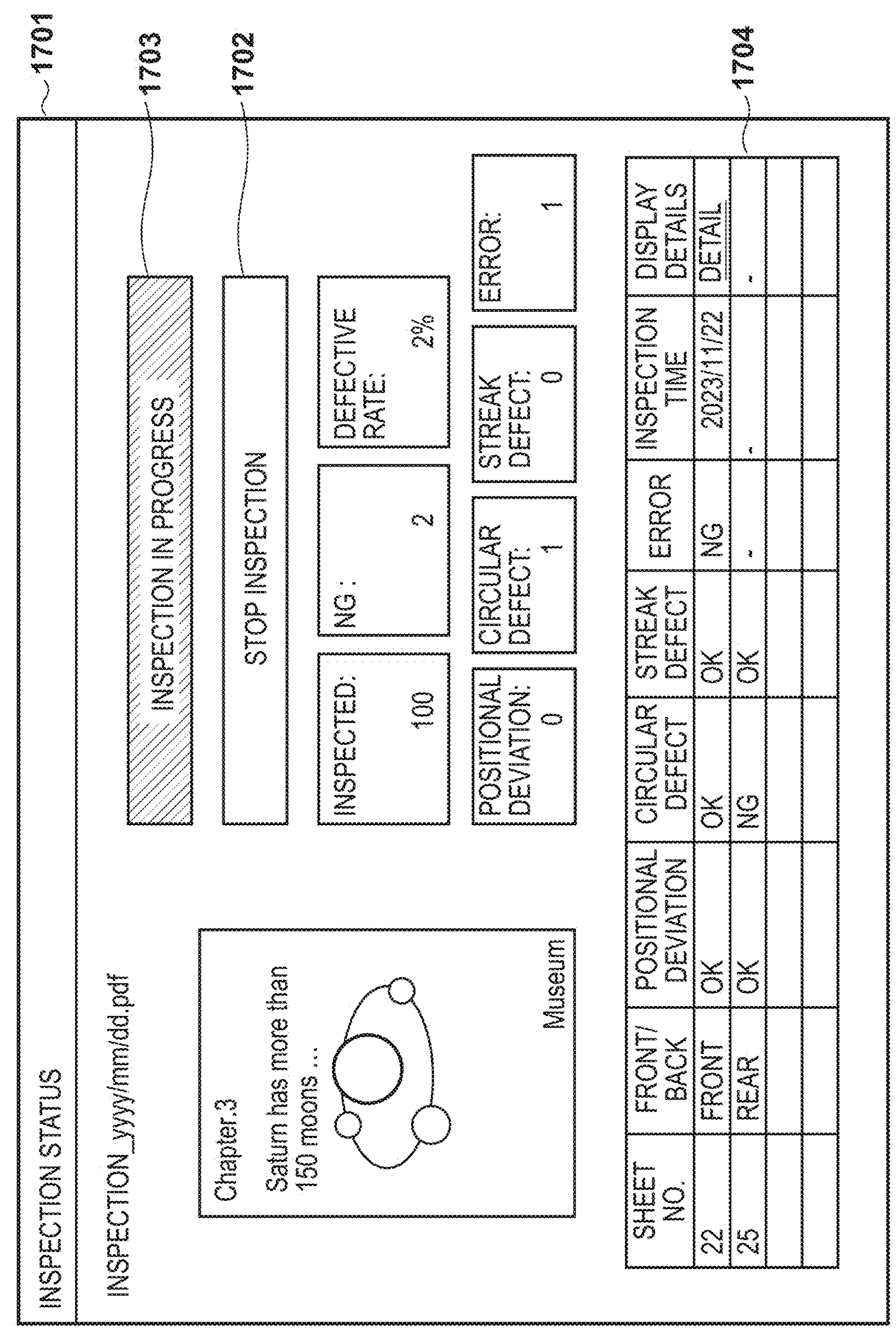

SCREEN FOR UPDATING INSPECTION LEVEL/ACCEPTING REQUEST FOR SERVICE CALL

F I G. 20

2001

| PageID | SHEET | INSPECTION LEVEL | |
|---|---|---|---|
| | | INSPECTION ITEM (STAIN (SPOTS)) | INSPECTION ITEM (STAIN (STREAKS)) |
| 0001 | EV_Car_Catalog (FOR FRONT COVER) | 7 | 7 |
| 0002 | EV_Car_Catalog (FOR BODY) | 6 | 6 |
| 0003 | EV_Car_Catalog (FOR BODY) | 6 | 6 |
| | | | |

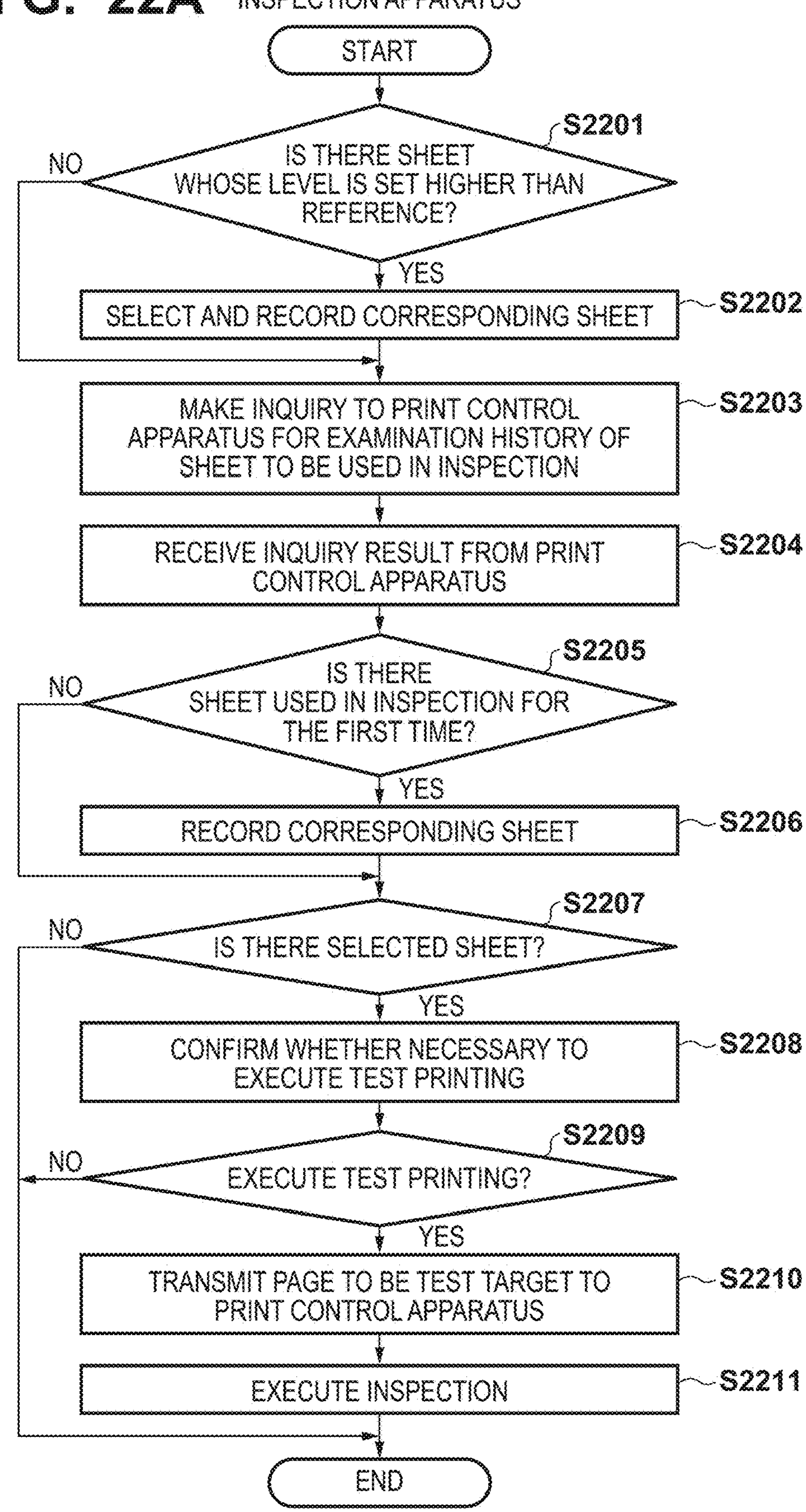
F I G. 22A
INSPECTION APPARATUS
START
S2201
IS THERE SHEET WHOSE LEVEL IS SET HIGHER THAN REFERENCE?
NO
YES
SELECT AND RECORD CORRESPONDING SHEET
S2202
MAKE INQUIRY TO PRINT CONTROL APPARATUS FOR EXAMINATION HISTORY OF SHEET TO BE USED IN INSPECTION
S2203
RECEIVE INQUIRY RESULT FROM PRINT CONTROL APPARATUS
S2204
S2205
IS THERE SHEET USED IN INSPECTION FOR THE FIRST TIME?
NO
YES
RECORD CORRESPONDING SHEET
S2206
S2207
IS THERE SELECTED SHEET?
NO
YES
CONFIRM WHETHER NECESSARY TO EXECUTE TEST PRINTING
S2208
S2209
EXECUTE TEST PRINTING?
NO
YES
TRANSMIT PAGE TO BE TEST TARGET TO PRINT CONTROL APPARATUS
S2210
EXECUTE INSPECTION
S2211
END

INSPECTION APPARATUS, INSPECTION METHOD, AND IMAGE FORMING APPARATUS

BACKGROUND OF THE INVENTION

Field of the Invention

The present invention relates to an inspection apparatus, an inspection method, and an image forming apparatus.

Description of the Related Art

There is known an inspection apparatus that scans a printed product printed by a printing apparatus and inspects quality. The inspection apparatus can detect a defective image such as a stain or omission of printing.

In this inspection, a method of comparing a printed product with an image free from defects registered as a reference image is adopted. After registering a reference image, an operator performs inspection setting of setting, for the reference image, a threshold and a region where a defect is detected, which is performed in an actual print job. After the end of the inspection setting, an actual print job of detecting a defect by scanning an actual printed product and comparing it with the registered reference image is executed.

An example of a method of performing inspection setting is a method of setting, for each reference image loaded by the inspection apparatus, an inspection level for each inspection item while viewing the image. This method can be expected to perform fine inspection setting, but this imposes a heavy load on the operator that performs various print operations every day. To reduce the inspection setting load, Japanese Patent Laid-Open No. 2023-155532 proposes a technique of an inspection setting method called standard inspection. In this inspection method, with respect to all reference images loaded by an inspection apparatus, the entire surface of a sheet is inspected at a predetermined standard inspection level.

As described above, the standard inspection is an effective inspection method to reduce the inspection setting load of the operator but there are various kinds of products generated in a printing system. For example, for a catalog in which high-grade products are printed, which aims to impress the brand to a user, the quality of a printed image is important. On the other hand, for a flyer printed with special sale items and the like, which is sent from a supermarket every day, images of items to be printed are not required to be high quality, and price information is more important. If inspection is performed for all printed products at the same level in statuses required by the respective printed products, divergence occurs between quality required for each product and a set quality inspection level. For example, if the default inspection level does not satisfy the inspection level for checking print quality required for the above-described catalog, an inspection apparatus fails to detect defects that should have been identified, and return occurs from an operation step at the succeeding stage of a print step. Alternatively, if the default inspection level is much higher than the inspection level for checking print quality necessary for the above-described flyer, excessive quality inspection is performed for the printed product. In this case, although there is no issue with quality, the inspection apparatus indicates a failed inspection result. Therefore, excessive detection often occurs, and an operator performs confirmation by viewing every time. In the standard inspection, even for printed products using a plurality of kinds of sheets of different sheet types, inspection is performed for all the sheets at the same inspection level, and thus missed inspection or excessive detection occurs depending on the sheet.

SUMMARY OF THE INVENTION

The present invention enables realization of a technique capable of reducing the work load of an operator while suppressing missed inspection or excessive detection in standard inspection by reflecting an appropriate inspection level on a sheet used for printing.

One aspect of the present invention provides an inspection apparatus comprising: one or more memory devices that store a set of instructions; and one or more processors that execute the set of instructions to: detect a defect of an image formed by scanning a sheet with an image formed thereon conveyed from an image forming unit, wherein the detecting the defect is to detect a defect at an inspection level decided based on sheet management information for linking an inspection level with sheet information and sheet information of the sheet with the image formed thereon.

Another aspect of the present invention provides an inspection apparatus comprising: one or more memory devices that store a set of instructions; and one or more processors that execute the set of instructions to: detect a defect of an image formed by scanning, by a scan unit, a sheet with an image formed thereon conveyed from an image forming unit; and specify sheet information of a sheet to be used to perform image formation and inspection, and decide an inspection level based on a sheet type of the sheet information.

Still another aspect of the present invention provides an image forming apparatus comprising: an image forming unit configured to form an image on a sheet; a scan unit configured to scan the sheet with the image formed thereon; one or more memories configured to store sheet management information for linking a sheet type and an inspection level; and the above inspection apparatus.

Yet still another aspect of the present invention provides an inspection method comprising: detecting a defect of an image formed by scanning, by a scan unit, a sheet with an image formed thereon conveyed from an image forming unit, wherein the detecting the defect is to detect a defect at an inspection level decided based on sheet management information for linking an inspection level with sheet information and sheet information of the sheet with the image formed thereon.

Further features of the present invention will become apparent from the following description of exemplary embodiments with reference to the attached drawings.

BRIEF DESCRIPTION OF THE DRAWINGS

FIG. 2 is a block diagram of the hardware configuration according to the embodiment;

FIG. 4 is a functional block diagram according to the embodiment;

FIG. 5 shows tables each showing an example of a relationship DB between a sheet type and an inspection level according to the embodiment;

FIG. 6 is a view showing an example of a sheet registration UI of a print control apparatus according to the embodiment;

FIG. 7 is a table showing an example of a sheet DB of the print control apparatus according to the embodiment;

FIG. 8A is a flowchart of inspection level decision in the print control apparatus/an image forming apparatus;

FIG. 8B is a flowchart of inspection level decision in an inspection apparatus;

FIG. 9 is a view showing an example of a sheet registration UI of the image forming apparatus according to the embodiment;

FIG. 14 is a flowchart of an inspection job execution operation of the inspection apparatus according to the embodiment;

FIG. 15 is a flowchart of reference image registration of the inspection apparatus according to the embodiment;

FIGS. 16A and 16B is an operation flowchart at the time of printing inspection of the inspection apparatus according to the embodiment;

FIGS. 17A and 17B are views each showing an example of an inspection status screen of the inspection apparatus according to the embodiment;

FIG. 20 is a table showing an example of a table for storing inspection items and inspection levels for each reference image according to the embodiment;

FIG. 22A is a flowchart of an inspection apparatus that decides, in a case where a high inspection level is set or a case where a sheet is used for the first time, whether to execute test printing using only that sheet;

DESCRIPTION OF THE EMBODIMENTS

First Embodiment

Figure 1:
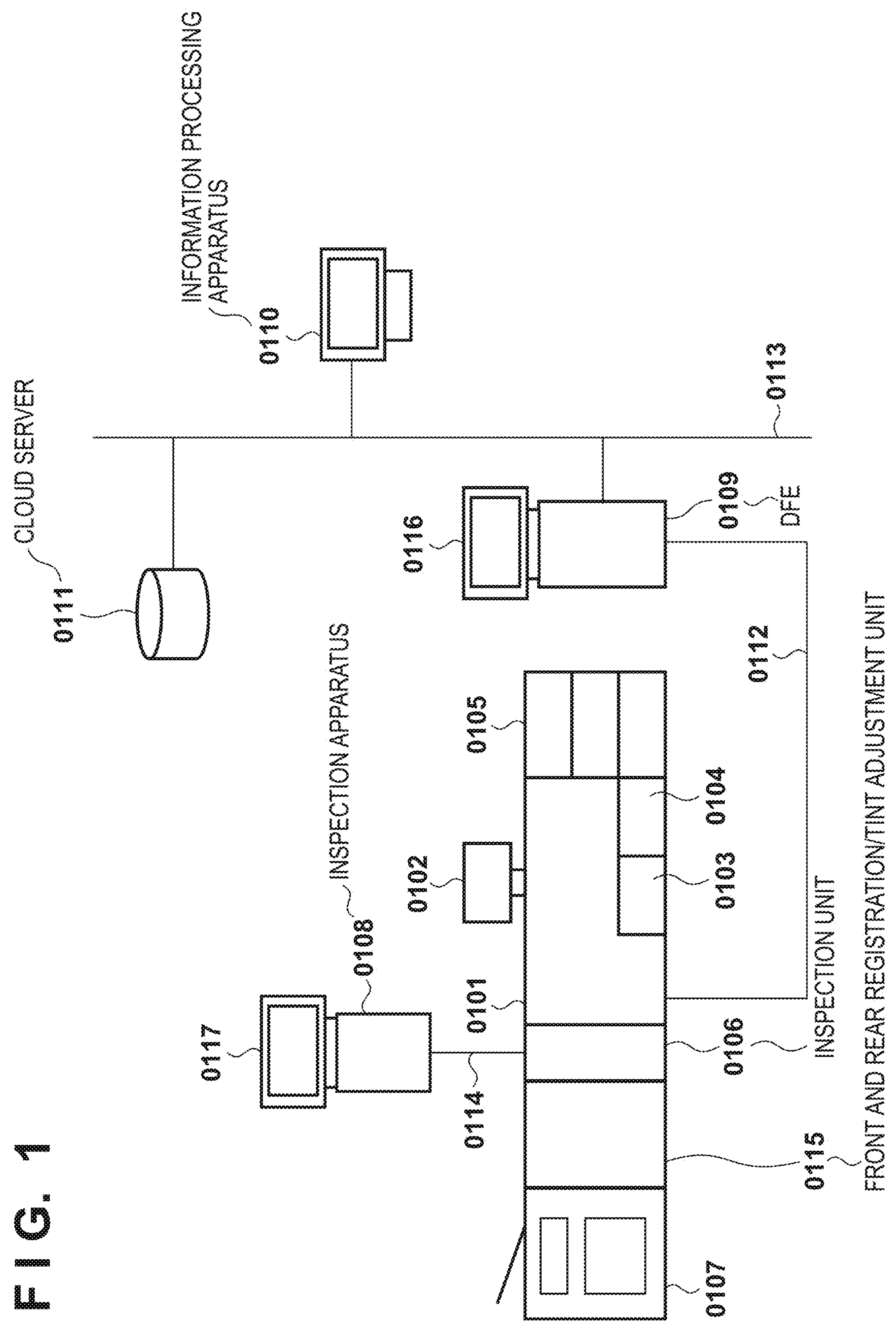
FIG. 1 is a view of a system configuration according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the present invention can be applied to an inspection apparatus formed from a single apparatus or a plurality of apparatuses as long as the inspection apparatus implements functions according to the present invention, as a matter of course, unless otherwise specified. The present invention can be applied to even an inspection apparatus connected via a network such as a LAN or a WAN as long as the functions of the present invention are implemented, as a matter of course. That is, a system configuration, in which various kinds of terminals are connected, to be described in the following embodiment is merely an example, and there are various configuration examples in accordance with the application purposes or objects.

The configuration of an inspection system according to this embodiment will be described with reference to FIG. 1. The inspection system according to this embodiment includes an information processing apparatus 0110, a print control apparatus 0109, an inspection apparatus 0108, an image forming apparatus 0101, and a cloud server 0111. Note that the image forming apparatus 0101 according to this embodiment will be described using an electrophotographic type apparatus. However, the image forming apparatus according to this embodiment may adopt a different image forming type such as an inkjet type or an offset type. The print control apparatus 0109 may be called a Digital Front End (DFE), and is an apparatus that performs data processing for causing the image forming apparatus 0101 to execute printing.

In the embodiment shown in FIG. 1, the image forming apparatus 0101 and the inspection apparatus 0108 will be described as separate apparatuses. However, this does not intend to limit the present invention, and these apparatuses may be integrated and provided as one apparatus. For example, the inspection apparatus 0108 may be an apparatus that forms the image forming apparatus 0101 by being integrated with the image forming apparatus 0101. Alternatively, for example, an apparatus obtained by including an inspection unit 0106 of the image forming apparatus 0101 in the inspection apparatus 0108 may be provided as an apparatus separated from the image forming apparatus 0101 or as an apparatus integrated with the image forming apparatus 0101. A front and rear registration/tint adjustment unit 0115 can be included in the inspection unit 0106 or the inspection apparatus 0108, as a matter of course. Furthermore, the components of the print control apparatus 0109 may be included in the inspection apparatus 0108 or the image forming apparatus 0101.

The image forming apparatus 0101 is connected to the print control apparatus 0109 via a cable 0112. The print control apparatus 0109 is connected to the information processing apparatus 0110 and the cloud server 0111 via a network 0113.

The image forming apparatus 0101 includes a UI panel 0102, a paper feed deck 0103, and a paper feed deck 0104. Furthermore, an optional deck 0105 including three stages of paper feed decks is connected to the image forming apparatus 0101. The image forming apparatus 0101 is, for example, an electrophotographic type printing apparatus. In addition, the UI panel 0102 is, for example, a user interface including an electrostatic capacitance type touch panel. Furthermore, the image forming apparatus 0101 includes the inspection unit 0106, a large capacity stacker 0107, and the front and rear registration/tint adjustment unit 0115. The inspection unit 0106 is connected to the inspection apparatus 0108 via a cable 0114. The large capacity stacker 0107 includes a main tray and a top tray, and several thousand sheets can be stacked on the main tray at once.

The print control apparatus 0109 includes a UI panel 0116. The UI panel 0116 is, for example, a user interface including an electrostatic capacitance type touch panel. The user operates the UI panel to instruct sheet generation and execution of a print job.

The inspection apparatus 0108 includes a UI panel 0117. The UI panel 0117 is, for example, a user interface including an electrostatic capacitance type touch panel. The user operates the UI panel 0117 to perform an operation associated with inspection.

The cloud server 0111 manages inspection information concerning inspection. In response to an inquiry from another apparatus, the cloud server 0111 transmits inspection information to the inquiry source.

A print job is generated by the information processing apparatus 0110, transmitted to the print control apparatus 0109 via the network 0113, and managed by the print control apparatus 0109. Alternatively, a print job can be generated on the print control apparatus 0109. A print job accepted by the print control apparatus 0109 from the information processing apparatus 0110 or generated by the print control apparatus 0109 is transmitted from the print control apparatus 0109 to the image forming apparatus 0101 via the cable 0112, and the image forming apparatus 0101 performs processing of printing on a sheet. Note that a print job may be generated/managed by the print control apparatus 0109, transmitted to the image forming apparatus 0101 via the cable 0112, and managed by the image forming apparatus 0101.

Note that the information processing apparatus 0110, the print control apparatus 0109, and the inspection apparatus 0108 may be connected to the cable 0112 to be communicable with the image forming apparatus 0101. In addition, the inspection apparatus 0108 may be connected to the print control apparatus 0109, the information processing apparatus 0110, and the cloud server 0111 via the network 0113. That is, the connection form of the image forming apparatus 0101, the print control apparatus 0109, and the information processing apparatus 0110 according to this embodiment is merely an example, and there are various connection forms other than the connection form described in this embodiment, as a matter of course.

The image forming apparatus 0101 may be connected to a finisher capable of stapling, a folding machine, a bookbinding machine, and the like in addition to the inspection unit 0106, the large capacity stacker 0107, and the front and rear registration/tint adjustment unit 0115 shown in FIG. 1.

The control configuration of the image forming apparatus 0101, the inspection apparatus 0108, the large capacity stacker 0107, the print control apparatus 0109, the front and rear registration/tint adjustment unit 0115, the information processing apparatus 0110, and the cloud server 0111 according to this embodiment will be described with reference to FIG. 2.

Image Forming Apparatus

The image forming apparatus 0101 includes a CPU 0201, a RAM 0202, a UI panel 0203, a paper feed deck I/F 0204, a storage unit 0205, a video I/F 0206, an NW I/F 0207, an accessory I/F 0208, an engine I/F 0209, a printer engine 0210, a paper feed deck 0211, and a system bus 0212.

The Central Processing Unit (CPU) 0201 performs control and operations of units in the image forming apparatus 0101 via the system bus 0212. The CPU 0201 executes control and operations of the units by reading out programs stored in the storage unit 0205 into the Random Access Memory (RAM) 0202 and executing them.

The RAM 0202 is a kind of general volatile storage device that the CPU 0201 can directly access, and is used as the work area of the CPU 0201 or another temporary data storage area. The storage unit 0205 stores programs, and also functions as a temporary storage area and a work memory at the time of the operation of the image forming apparatus 0101.

The engine I/F 0209 conducts communication with the printer engine 0210 and control thereof.

The paper feed deck I/F 0204 conducts communication with the paper feed deck 0211 and control thereof. The paper feed deck 0211 is the general term of hardware configurations for the paper feed decks 0103 and 0104 and the optional deck 0105.

The UI panel 0203 is the hardware configuration of the UI panel 0102, and is a user interface configured to perform the general operation of the image forming apparatus 0101. In this embodiment, the UI panel 0203 includes an electrostatic capacitance type touch panel.

The network interface (to be referred to as an NW I/F hereinafter) 0207 is connected to an NW I/F 0238 of the print control apparatus 0109 via a cable 0213, and conducts communication between the print control apparatus 0109 and the image forming apparatus 0101. Note that in this example, interfaces connected to the system bus 0212 and a system bus 0239 are directly connected to each other. As a connection form, the print control apparatus 0109 and the image forming apparatus 0101 may be connected via, for example, a network, and the connection form is not limited. The video I/F 0206 is connected to a video I/F 0233 via a video cable 0241, and conducts communication of image data between the print control apparatus 0109 and the image forming apparatus 0101.

Note that the connection interface of the print control apparatus 0109 to the image forming apparatus 0101 may integrate the functions of the NW I/F 0238 and the video I/F 0233. In addition, the connection interface of the image forming apparatus 0101 to the print control apparatus 0109 may integrate the functions of the NW I/F 0207 and the video I/F 0206.

An accessory I/F 0208 is connected to accessory I/Fs 0214, 0220, and 0254 via a cable 0225. That is, the image forming apparatus 0101 communicates with the inspection unit 0106, the large capacity stacker 0107, and front and rear registration/tint adjustment unit 0115 via the accessory I/Fs 0208, 0214, 0220, and 0254.

Furthermore, the image forming apparatus 0101 prints an image for registration adjustment or tint correction based on an instruction from the inspection apparatus 0108. Then, the image forming apparatus 0101 receives the degree of deviation of a print position and the degree of deviation of a tint sent from the front and rear registration/tint adjustment unit 0115, and adjusts a print start position and a tint.

Inspection Unit

The inspection unit 0106 includes the accessory I/F 0214, an inspection apparatus I/F 0215, a CPU 0216, a RAM 0217, an image capturing unit 0218, a storage unit 0247, and a system bus 0219. The CPU 0216 reads out programs stored in the storage unit 0247 into the RAM 0217 via the system bus 0219. Then, the CPU 0216 operates the programs to perform control and operations of units in the inspection unit 0106.

The RAM 0217 is a kind of general volatile storage device that the CPU 0216 can directly access, and is used as the work area of the CPU 0216 or another temporary data storage area. The storage unit 0247 stores programs, and also functions as a temporary storage area and a work memory at the time of the operation of the inspection apparatus 0106.

The inspection apparatus I/F 0215 is connected to an inspection unit I/F 0231 via a cable 0260. That is, the inspection unit 0106 communicates with the inspection apparatus 0108 via the inspection apparatus I/F 0215 and the inspection unit I/F 0231.

The image capturing unit 0218 has an image capturing function with, for example, a contact image sensor (to be referred to as a "CIS" hereinafter), captures a sheet passing through the inspection unit, and transmits the captured image to the inspection apparatus 0108 via the inspection apparatus I/F 0215. The CIS is an image sensor formed by integrating a sensor (light-receiving element), a light source (LED), and a rod lens array (equal magnification imaging lens), and can scan an image compactly printed on a sheet by moving close to the surface of the sheet, as compared with a camera. Note that the CIS of the image capturing unit 0218 is an example of a sensor, a sensor of another type such as a CCD image sensor may be used, and the image capturing method thereof is not limited.

There are two purposes of transmitting a captured image. One purpose is to capture a printed product of a print job as an inspection target and transmit it to the inspection apparatus 0108 for inspection regardless of an inspection method. The other purpose is to execute printing and image capturing for a print job of one copy or a plurality of copies in order to create a reference image and transmit a captured image as a reference image to the inspection apparatus 0108 before a print job as an inspection target. The inspection apparatus 0108 stores the transmitted image as a reference image in the storage unit 0228.

Large Capacity Stacker

The large capacity stacker 0107 includes the accessory I/F 0220, a CPU 0221, a RAM 0222, a discharge unit 0223, a storage unit 0248, and a system bus 0224. The CPU 0221 reads out programs stored in the storage unit 0248 into the RAM 0222 via the system bus 0224. Then, the CPU 0221 operates the programs to perform control and operations of units in the large capacity stacker 0107.

The RAM 0222 is a kind of general volatile storage device that the CPU 0221 can directly access, and is used as the work area of the CPU 0221 or another temporary data storage area.

The storage unit 0248 stores programs, and also functions as a temporary storage area and a work memory at the time of the operation of the large capacity stacker 0107. The discharge unit 0223 conducts a discharge operation to the main tray and the top tray and monitoring and control of the stacking state on each of the main tray and the top tray.

Inspection Apparatus

The inspection apparatus 0108 includes a CPU 0226, a RAM 0227, a storage unit 0228, a PDL analysis unit 0229, the inspection unit I/F 0231, a display unit 0245, and a system bus 0230. The CPU 0226 reads out programs stored in the storage unit 0228 into the RAM 0227 via the system bus 0230. Then, the CPU 0226 operates the programs to perform control and operations of units in the inspection apparatus 0108.

The RAM 0227 is a kind of general volatile storage device that the CPU 0226 can directly access, and is used as the work area of the CPU 0226 or another temporary data storage area. The storage unit 0228 stores programs, and also functions as a temporary storage area and a work memory at the time of the operation of the inspection apparatus 0108. The PDL analysis unit 0229 loads PDL data such as PDF, PostScript, and PCL received from the information processing apparatus 0110 or the print control apparatus 0109, and executes interpretation processing. The display unit 0245 is, for example, a liquid crystal display connected to the inspection apparatus 0108, and accepts a user input to the inspection apparatus 0108 or displays the state of the inspection apparatus 0108.

Furthermore, the inspection apparatus 0108 instructs the image forming apparatus 0101 to perform registration adjustment and tint correction.

Print Control Apparatus

The print control apparatus 0109 includes a CPU 0234, a RAM 0235, a storage unit 0236, an NW I/F 0237, the NW I/F 0238, the video I/F 0233, a UI panel 0261, and the system bus 0239.

The CPU 0234 reads out programs stored in the storage unit 0236 into the RAM 0235 via the system bus 0239. Then, the CPU 0234 operates the programs to perform control and operations of units in the print control apparatus 0109.

The RAM 0235 is a kind of general volatile storage device that the CPU 0234 can directly access, and is used as the work area of the CPU 0234 or another temporary data storage area.

The storage unit 0236 stores programs, and also functions as a temporary storage area and a work memory at the time of the operation of the information processing apparatus.

The NW I/F 0237 is connected to an NW I/F 0240 of the information processing apparatus 0110 via a network. The print control apparatus 0109 communicates with the information processing apparatus 0110 via the NW I/F 0237.

The NW I/F 0238 is connected to the NW I/F 0207 of the image forming apparatus 0101 via the cable 0213. Furthermore, the print control apparatus 0109 communicates with the image forming apparatus 0101 via the NW I/F 0240.

The print control apparatus 0109 accepts a sheet generation instruction, a print job execution instruction, or the like from the operator via the UI panel 0261. The inspection apparatus 0108 may include an NW I/F, and the print control apparatus 0109 may communicate with the inspection apparatus 0108 via the NW I/F 0237 and the NW I/F of the inspection apparatus 0108. Consider, for example, a case where inspection is used as an inspection method and a RIP image used by the image forming apparatus 0101 for printing is used as a reference image. In this case, the reference image may be transmitted to the inspection apparatus 0108 via the inspection apparatus I/F 0215 or transmitted to the inspection apparatus 0108 from the NW I/F of the inspection apparatus 0108 via the NW I/Fs 0207 and 0237.

Client Computer

The information processing apparatus 0110 functions as a client computer.

The information processing apparatus 0110 includes the NW I/F 0240, a RAM 0242, a CPU 0243, a storage unit 0244, and a system bus 0246.

The CPU 0243 reads out programs stored in the storage unit 0244 into the RAM 0242 via the system bus 0246. Then, the CPU 0243 operates the programs to perform control and operations of units in the information processing apparatus 0110.

The RAM 0242 is a kind of general volatile storage device that the CPU 0243 can directly access, and is used as the work area of the CPU 0243 or another temporary data storage area.

The storage unit 0244 stores programs, and also functions as a temporary storage area and a work memory at the time of the operation of the information processing apparatus 0110.

Sheet/Inspection Management Server

The cloud server 0111 functions as a sheet/inspection management server.

The cloud server 0111 includes an NW I/F 0249, a CPU 0250, a RAM 0251, a storage unit 0252, and a system bus 0253.

The CPU 0250 reads out programs stored in the storage unit 0252 into the RAM 0251 via the system bus 0253. Then, the CPU 0250 operates the programs to perform control and operations of units in the cloud server 0111.

The RAM 0251 is a kind of general volatile storage device that the CPU 0250 can directly access, and is used as the work area of the CPU 0250 or another temporary data storage area. The storage unit 0252 stores programs, and also functions as a temporary storage area and a work memory at the time of the operation of the cloud server 0111.

Front and Rear Registration/Tint Adjustment Unit

The front and rear registration/tint adjustment unit 0115 includes the accessory I/F 0254, a CPU 0255, a RAM 0256, a storage unit 0257, a scan unit 0258, and a system bus 0259. The "front and rear registration" indicates registration processing of registering images to be formed on the front and rear surfaces of a sheet.

The CPU 0255 reads out programs stored in the storage unit 0257 into the RAM 0256 via the system bus 0259. Then, the CPU 0255 operates the programs to perform control and operations of units in the front and rear registration/tint adjustment unit 0115.

The RAM 0256 is a kind of general volatile storage device that the CPU 0255 can directly access, and is used as the work area of the CPU 0255 or another temporary data storage area.

The storage unit 0257 stores programs, and also functions as a temporary storage area and a work memory at the time of the operation of the front and rear registration/tint adjustment unit 0115. The scan unit 0258 scans a mark for registration correction and an image patch for tint adjustment from a captured image sent from an image capturing device provided in the front and rear registration/tint adjustment unit 0115.

The CPU 0255 calculates the degree of deviation of a print position and the degree of deviation of a tint from the mark for registration correction and the image patch for tint adjustment acquired from the scan unit 0258, and sends the print position deviation or tint correction information to the image forming apparatus 0101.

Figure 3:
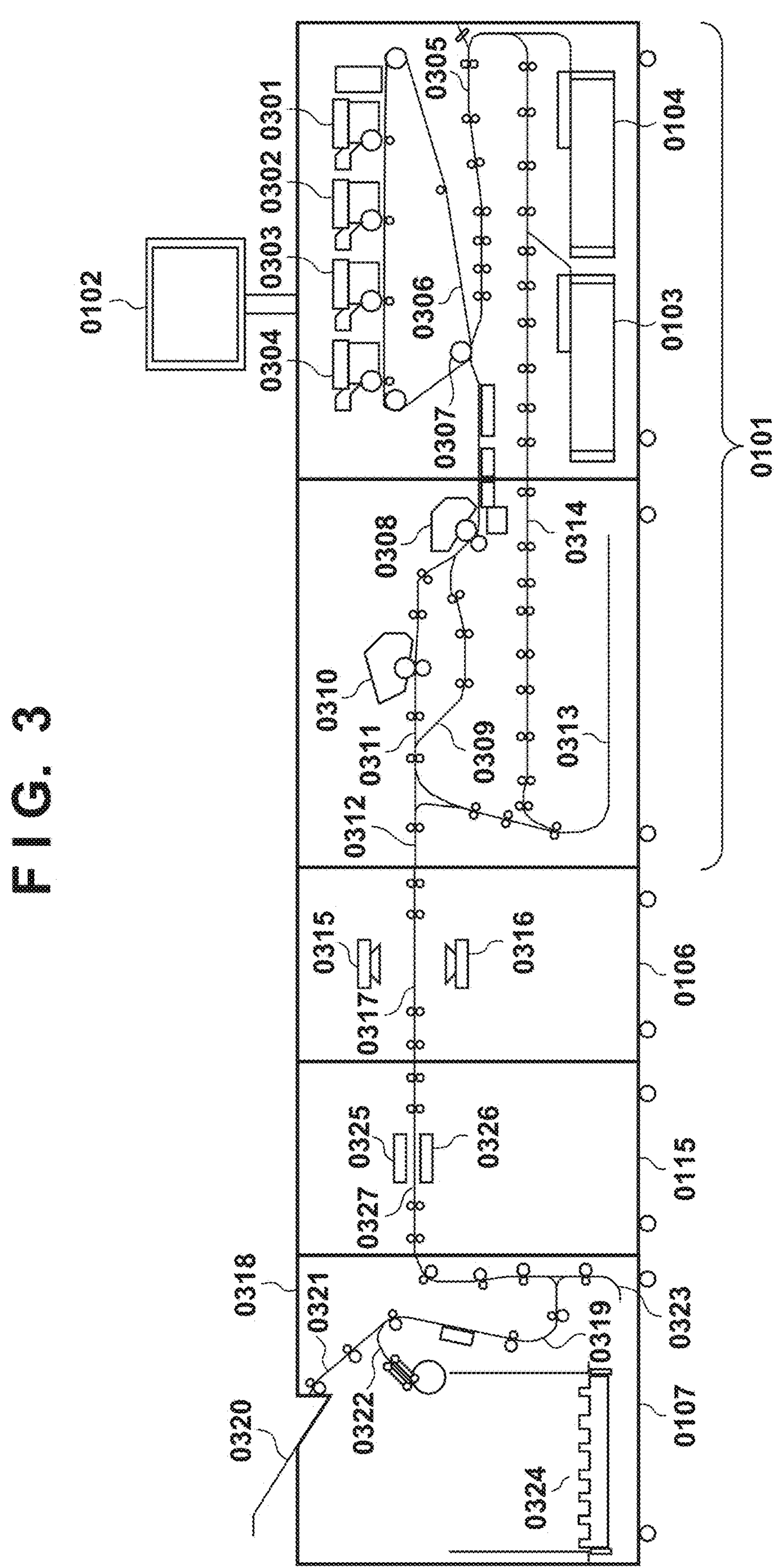
FIG. 3 is a view showing the internal configuration of a system according to the embodiment.

The internal configuration of the image forming apparatus 0101 will be described with reference to FIG. 3. The image forming apparatus 0101 includes the inspection unit 0106, the large capacity stacker 0107, and the front and rear registration/tint adjustment unit 0115 in addition to the main body for forming an image.

The image forming apparatus 0101 accepts a user input via the UI panel 0102 or displays the state of printing or a device. Various kinds of sheets can be stored in the paper feed decks 0103 and 0104. In each paper feed deck, only the uppermost one of the stored sheets can be separated and conveyed to a sheet conveyance path 0305. To form a color image, development stations 0301 to 0304 form toner images using color toners of Y, M, C, and K, respectively. The toner image formed here is primarily transferred to an intermediate transfer belt 0306. The intermediate transfer belt 0306 rotates clockwise in FIG. 3, and the toner image is transferred, at a secondary transfer position 0307, to the sheet conveyed from the sheet conveyance path 0305. A fixing unit 0308 includes a pressurizing roller and a heating roller. When the sheet passes between the rollers, the toner is melted and press-bonded, thereby fixing the toner image on the sheet. The sheet that has left the fixing unit 0308 is conveyed to a portion 0312 via a sheet conveyance path 0309. If further melting and press-bonding is necessary for fixing in accordance with the sheet type, the sheet is conveyed to a second fixing unit 0310 using an upper sheet conveyance path after passing through the fixing unit 0308. Then, after the sheet undergoes additional melting and press-bonding, the sheet is conveyed to the portion 0312 via a sheet conveyance path 0311. If the image forming mode is a double-sided mode, the sheet is conveyed to a sheet reversing path 0313, reversed in the sheet reversing path 0313, and conveyed to a double-sided conveyance path 0314, thereby performing image transfer to the second surface at the secondary transfer position 0307.

In the inspection unit 0106, CISs 0315 and 0316 are arranged facing each other. The CIS 0315 is a sensor configured to scan the upper surface of the sheet, and the CIS 0316 is a sensor configured to scan the lower surface of the sheet. The inspection unit 0106 scans the sheet using the CISs 0315 and 0316 at a timing when the sheet conveyed to a sheet conveyance path 0317 reaches a predetermined position. The scanned image is transmitted to the inspection apparatus 0108 via the inspection apparatus I/F 0215 and the inspection unit I/F 0231. The CPU 0226 of the inspection apparatus 0108 determines whether the received image includes a defect, and notifies the inspection unit 0106 of the determination result via the inspection unit I/F 0231 and the inspection apparatus I/F 0215. The CPU 0216 of the inspection unit 0106 notifies the large capacity stacker 0107 of the received determination result via the accessory I/Fs 0214 and 0220.

In the front and rear registration/tint adjustment unit 0115, CISs 0325 and 0326 are arranged facing each other. The CIS 0325 is a sensor configured to scan the upper surface of the sheet, and the CIS 0326 is a sensor configured to scan the lower surface of the sheet. The front and rear registration/tint adjustment unit 0115 scans the sheet using the CISs 0325 and 0326 at a timing when the sheet conveyed to a sheet conveyance path 0327 reaches a predetermined position. Then, the front and rear registration/tint adjustment unit 0115 reads out position information of a registration mark for front and rear registration correction and patch information from the scanned image, and transmits them to the image forming apparatus 0101 via the accessory I/F 0254. The CPU 0201 calculates correction values based on information concerning the deviation of front and rear registration and the deviation of the tint from the received information, and performs adjustment of a print start position and tint correction processing.

The large capacity stacker 0107 is a stacker that can stack a large capacity of sheets. The large capacity stacker 0107 includes a main tray 0324 as a tray on which sheets are stacked. The sheet that has passed through the inspection unit 0106 enters the large capacity stacker 0107 via a sheet conveyance path 0319. The sheet passes through a sheet conveyance path 0322 from the sheet conveyance path 0319, and is stacked on the main tray 0324. Furthermore, the large capacity stacker 0107 includes a top tray 0320 as a discharge tray. The CPU 0221 discharges, to the top tray 0320, a sheet in which a defect is detected by the inspection apparatus 0108. To output a sheet to the top tray 0320, the sheet is conveyed from the sheet conveyance path 0319 to the top tray 0320 via a sheet conveyance path 0321. A reversing portion 0323 reverses a sheet. The reversing portion 0323 is used to stack a sheet on the main tray 0324. When stacking a sheet on the main tray 0324, the sheet is reversed once by the reversing portion 0323 such that the direction of the sheet upon stacking becomes the same as the direction of the sheet that enters. When conveying a sheet to the top tray 0320, the sheet is directly discharged without being flipped at the time of stacking, and thus the reversing operation in the reversing portion 0323 is not performed.

Software components operating on each hardware component of the inspection system according to this embodiment will be described with reference to FIG. 4.

Print Control Apparatus

On the print control apparatus 0109, an NW control module 0401, a UI control module 0402, a printer control module 0403, and a sheet information control module 0404 operate. These software modules are stored as programs in the storage unit 0236, and are implemented by deploying the programs to the RAM 0235 and executing them by the CPU 0234. The NW control module 0401 controls communication with another device. The UI control module 0402 controls contents displayed on the UI panel 0116, and sends a control instruction to another control module based on an accepted instruction. In response to an operation request from the image forming apparatus 0101, the printer control module 0403 performs RIP processing of a print job, inputs a job to the image forming apparatus 0101, and transmits configuration information of the print control apparatus 0109 to the image forming apparatus 0101. The sheet information control module 0404 generates sheet information based on a sheet generation instruction accepted from the operator via the UI panel 0116, and saves it in the storage unit 0236. If the sheet information is updated, the information is transmitted to the image forming apparatus 0101.

Image Forming Apparatus

On the image forming apparatus 0101, an NW control module 0411, a UI control module 0412, a print control module 0413, and a sheet information control module 0414 operate. These software modules are stored as programs in the storage unit 0205, and are implemented by deploying the programs to the RAM 0202 and executing them by the CPU 0201. The NW control module 0411 controls communication with another device. The UI control module 0412 controls contents displayed on the UI panel 0203, and sends a control instruction to another control module based on an accepted instruction. In response to an operation request from the print control apparatus 0109, the print control module 0413 executes a print jog. The sheet information control module 0414 generates sheet information based on a sheet generation instruction accepted from the operator via the UI panel 0203, and saves it in the storage unit 0205. If the sheet information is updated, the information is transmitted to the print control apparatus 0109.

Inspection Apparatus

On the inspection apparatus 0108, an NW control module 0421, a UI control module 0422, an inspection information storage module 0423, and an inspection control module 0424 operate. These software modules are stored as programs in the storage unit 0228, and are implemented by deploying the programs to the RAM 0227 and executing them by the CPU 0226. The NW control module 0421 controls communication with another device. The UI control module 0422 controls contents displayed on the display unit 0245, and sends a control instruction to another control module based on an accepted instruction. The inspection information storage module 0423 stores information associated with inspection, such as settings necessary for inspection, a reference image, and an inspection result. The inspection control module 0424 performs control necessary for inspection, such as inspection setting accepted from the UI control module 0422, registration of a reference image, and comparison between the reference image and an inspection image.

Information Processing Apparatus

On the information processing apparatus 0110, an NW control module 0431, a UI control module 0432, and a job control module 0433 operate. These software modules are stored as programs in the storage unit 0244, and are implemented by deploying the programs to the RAM 0242 and executing them by the CPU 0243. The NW control module 0431 controls communication with another device. The UI control module 0432 controls contents displayed on the UI panel 0261 of the print control apparatus 0109, and sends a control instruction to another control module based on an accepted instruction. The job control module 0433 displays job properties on the UI panel 0261 of the print control apparatus 0109 via the UI control module 0432, and instructs the print control apparatus 0109 to execute an accepted job. The information displayed on the UI panel 0261 of the print control apparatus 0109 may be displayed on the display device of the information processing apparatus 0110.

Sheet/Inspection Management Server

On the cloud server 0111, an NW control module 0441 and a sheet/inspection information control module 0442 operate. These software modules are stored as programs in the storage unit 0252, and are implemented by deploying the programs to the RAM 0251 and executing them by the CPU 0250. The NW control module 0441 controls communication with another device. The sheet/inspection information control module 0442 holds information concerning an inspection level for each sheet type, and returns, to an inquiry source, information concerning an inspection level corresponding to an accepted sheet type via the NW control module 0441.

Processing of Sending Sheet Type Information to Inspection Apparatus, Receiving Inspection Levels, and Linking Inspection Levels with Sheet Information at Time of Sheet Generation in Print Control Apparatus The relationship between a sheet type and an inspection level will be described with reference to FIG. 5. Each table shown in FIG. 5 is a table concerning inspection levels for each sheet type, which is held by the inspection apparatus 0108. These tables are stored in the storage unit 0228, and the inspection control module 0424 instructs the inspection information storage module 0423 to acquire information from the tables.

A table 0501 stores default inspection level information applied at the time of executing standard inspection in the inspection apparatus 0108.

A table 0502 records, for each sheet type (surface property), values to be adjusted with respect to the default inspection levels stored in the table 0501. For example, in a case where the sheet type (surface property) is a recycled sheet, the inspection level of an inspection item (stain (streaks)) is adjusted to inspection level 4 by calculating standard inspection level 5 in the table 0501 and (−1) recorded in the table 0502. Since an adjustment value of an inspection item (stain (spots)) is 0, the inspection level after adjustment remains 5.

A table 0503 records, for each sheet type (basis weight), adjustment values to be adjusted with respect to the default inspection levels stored in the table 0501. For example, in a case where a sheet of a basis weight (351 to 400) is selected, the inspection levels of the inspection item (stain (streaks))

and the inspection item (stain (spots)) are adjusted to inspection level 7 by calculating level 5 in the table 0501 and (+2) recorded in the table 0503.

When the print control apparatus 0109 performs sheet generation, the adjustment values for the sheet type (surface property) of the table 0502 and the sheet type (basis weight) of the table 0503 are added/subtracted to/from the values of the default inspection levels stored in the table 0501.

FIG. 6 shows an example of an input screen for accepting sheet generation in the print control apparatus 0109. An input screen 0601 is stored in the storage unit 0236, and the UI control module 0402 displays the input screen 0601 on the UI panel 0261 based on a sheet generation instruction from the operator in the UI control module 0402. The operator can operate the UI panel 0261 to edit each item. A name of a sheet is input to a region 0602. A region 0603 is a region for selecting the surface property of the sheet. In regions 0605 to 0608, inspection levels when applying the inspection item (stain (spots)) and the inspection item (stain (streaks)) to the front surface/rear surface of the sheet are displayed in advance. The display of the inspection levels and an application method will be described later. It is possible to edit the displayed inspection levels on this input screen.

FIG. 7 shows an example of a sheet management table held by the print control apparatus 0109. A sheet management table 0701 is stored in the storage unit 0236. When an OK button 0609 is operated on the input screen 0601 shown in FIG. 6, the sheet information control module 0404 records the contents displayed in the regions 0602 to 0608 in the sheet management table 0701. In the sheet management table 0701 shown in FIG. 7, six types of sheets of 0001 to 0006 are registered and managed for sheet names input in FIG. 6, respectively. This sheet management table is an example of sheet management information according to the present invention.

Processing of deciding and saving inspection levels at the time of sheet generation according to this embodiment will be described with reference to flowcharts shown in FIGS. 8A and 8B. The flowchart of FIG. 8A represents processing of deciding and saving inspection levels at the time of sheet generation in the print control apparatus 0109 according to the first embodiment. Processing to be described below is implemented by, for example, reading out programs stored in the storage unit 0236 into the RAM 0235 and executing them by the CPU 0234 of the print control apparatus 0109. The step number of each process included in the flowchart will be represented by a reference symbol starting with “S” hereinafter. The same applies to subsequent flowcharts.

The flowchart of the print control apparatus 0109 starts when the operator issues a sheet registration instruction by operating the UI panel 0261. In step S0801, the UI control module 0402 acquires the input screen 0601 from the storage unit 0236, and displays it on the UI panel 0261. Then, the process advances to step S0802.

When the operator performs an input operation by operating the UI panel 0261, the sheet information control module 0404 records the input items in the RAM 0235, and advances the process to step S0803. In step S0803, the sheet information control module 0404 accesses the RAM 0235, and determines whether the accepted input is associated with a sheet type. If the accepted input is not associated with a sheet type (NO), the process advances to step S0807. If the accepted input is associated with a sheet type (YES), the process advances to step S0804.

In step S0804, the sheet information control module 0404 sends an inspection level information request corresponding to the input sheet type to the inspection apparatus 0108 via the NW control module 0401. Then, the process advances to step S0805. Upon receiving inspection level information from the inspection apparatus 0108 in step S0805, the process advances to step S0806. In step S0806, the sheet information control module 0404 instructs the UI control module 0402 to reflect the received inspection level information on the input screen 0601.

For example, assume that if “recycled sheet” is input to the region 0603, the inspection levels of the inspection item (stain (spots)) and the inspection item (stain (streaks)) linked with this sheet type are “Lv. 5” and “Lv. 4” with respect to the front surface/rear surface of the sheet. The inspection levels are received from the inspection apparatus 0108, and are displayed in the regions 0605 to 0608 in FIG. 6, respectively. The inspection level information received from the inspection apparatus 0108 is displayed, and the process advances to step S0807.

When the operator operates the OK button 0609, the process advances to step S0808. In step S0808, the sheet information control module 0404 records the contents displayed on the input screen 0601 in the sheet management table 0701. In this example, the contents displayed on the input screen 0601 are recorded as the sheet ID “0001”. Then, the process ends.

The processing of the inspection apparatus 0108 according to the first embodiment will be described with reference to the flowchart of FIG. 8B. Processing to be described below is implemented by, for example, reading out programs stored in the storage unit 0228 into the RAM 0227 and executing them by the CPU 0226 of the inspection apparatus 0108. The flowchart of the inspection apparatus 0108 starts when the inspection apparatus 0108 is powered on.

Upon receiving an inspection level information request from the print control apparatus 0109 via the NW control module 0421, the inspection control module 0424 advances the process from step S0811 to step S0812. In step S0812, the inspection control module 0424 accesses the tables 0502 and 0503 stored in the inspection information storage module 0423 to confirm the sheet type (surface property) and the sheet type (basis weight) for which the inspection level information is requested. If the corresponding sheet types exist in the tables 0502 and 0503, the stored numerical values of adjustment and the numerical values of the default levels stored in the table 0501 are added to confirm the inspection levels.

If, for example, the sheet type (surface property) is “recycled sheet” and the sheet type (basis weight) is “64 gsm”, the sheet type (surface property) of “recycled paper” exists in the table 0502 but an item corresponding to the sheet type (basis weight) of “64 gsm” does not exist in the table 0503. In this case, the numerical values of adjustment stored for the sheet type (surface property) of “recycled paper” are added to the values of the default levels stored in the table 0501, thereby confirming the inspection levels of the inspection item (stain (spots)) and the inspection item (stain (streaks)). After confirming the inspection levels, the process advances to step S0813. In step S0813, the inspection control module 0424 transmits the confirmed inspection level information to the print control apparatus 0109 via the NW control module 0421, and ends the processing.

Processing of Sending Sheet Type Information to Inspection Apparatus, Receiving Inspection Levels, and Linking Inspection Levels with Sheet Information at Time of Sheet Generating in Image Forming Apparatus FIG. 9 shows a setting screen for accepting sheet generation in the image forming apparatus 0101. A setting screen 0901 is stored in the storage unit 0205, and the UI control module 0412 displays the setting screen 0901 on the UI panel 0203 based on a sheet generation instruction on the UI panel 0203 from the operator. The operator can edit each item by operating the UI panel 0203. A name of a sheet is input to a region 0902. A region 0903 is a region for selecting the basis weight of the sheet. A region 0904 is a region for selecting the surface property of the sheet. In regions 0905 to 0908, inspection levels when applying the inspection item (stain (spots)) and the inspection item (stain (streaks)) to the front surface/rear surface of the sheet are displayed.

Similar to the print control apparatus 0109, the image forming apparatus 0101 has the sheet management table 0701 shown in FIG. 7. The sheet management table 0701 is stored in the storage unit 0205. Note that the sheet management table 0701 may be stored in both or one of the storage units of the inspection unit 0106 and the inspection apparatus 0108.

Similar to the print control apparatus 0109, the image forming apparatus 0101 has a program for executing the processing of the flowchart shown in FIG. 8A. The program for executing the processing of the flowchart of the image forming apparatus 0101 is stored in the storage unit 0205, and is read out into the RAM 0202 and executed by the CPU 0201. The flowchart of the image forming apparatus 0101 starts when the operator issues a sheet registration instruction by operating the UI panel 0203. In step S0801, the UI control module 0412 acquires the setting screen 0901 from the storage unit 0205, and displays it on the UI panel 0203. Then, the process advances to step S0802. Subsequent processes are the same as those described with respect to the print control apparatus 0109. The sheet information control module 0414 records sheet information in the sheet management table 0701, and the NW control module 0411 performs communication with the inspection apparatus 0108. The processing has been explained above and a description thereof will be omitted.

Upon receiving an inspection level information request from the image forming apparatus 0101, the inspection apparatus 0108 performs processing of calculating inspection level information from sheet type information and transmitting it to the image forming apparatus 0101. This processing has been explained in the processing procedure of FIG. 8B when the print control apparatus 0109 requests inspection levels, and a description thereof will be omitted.

As an example, the inspection levels received from the inspection apparatus 0108 are displayed in advance in the regions 0905 to 0908 of the setting screen 0901. In the first embodiment, when the operator operates a registration button 0909, the inspection levels are recorded in the sheet management table 0701. The contents displayed in the sheet management table 0701 are recorded as the sheet ID "0002"

Processing of Synchronizing Sheet Information Between Print Control Apparatus and Image Forming Apparatus In a case where sheet information held by each of the print control apparatus 0109 and the image forming apparatus 0101 is updated by addition/edition/deletion, each apparatus transmits the contents to the other apparatus, thereby synchronizing the information described in the sheet management table 0701. This processing will be described.

Figure 10A:
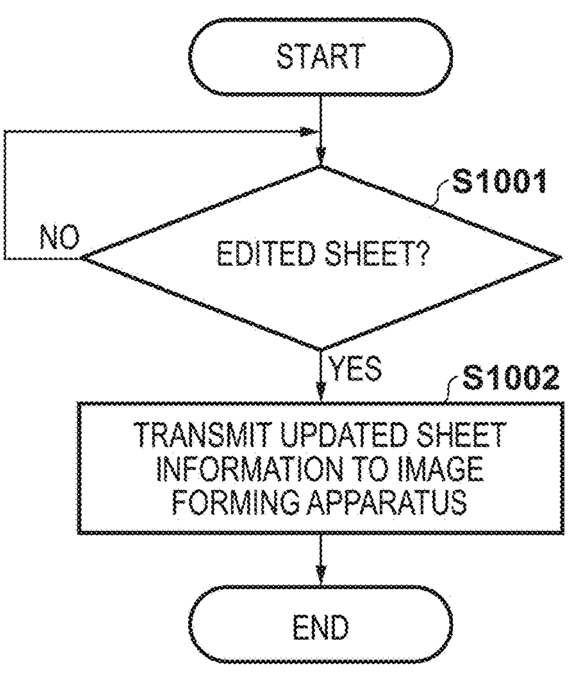
FIGS. 10A to 10D are flowcharts for synchronizing sheet information between the print control apparatus and the image forming apparatus.

A flowchart shown in FIG. 10A represents processing of the print control apparatus 0109 when synchronizing the sheet information between the print control apparatus 0109 and the image forming apparatus 0101 according to the first embodiment. The processing of this flowchart is implemented by, for example, reading out programs stored in the storage unit 0236 into the RAM 0235 and executing them by the CPU 0234 of the print control apparatus 0109.

The flowchart of the print control apparatus 0109 starts when the print control apparatus 0109 is powered on, and is repeated until the print control apparatus 0109 is powered off. If the sheet management table 0701 is updated, the sheet information control module 0404 acquires the edited sheet information in step S1001. Then, the process advances to step S1002. In step S1002, the sheet information control module 0404 transmits the updated sheet information to the image forming apparatus 0101 via the NW control module 0401. Then, the processing ends.

Figure 10B:
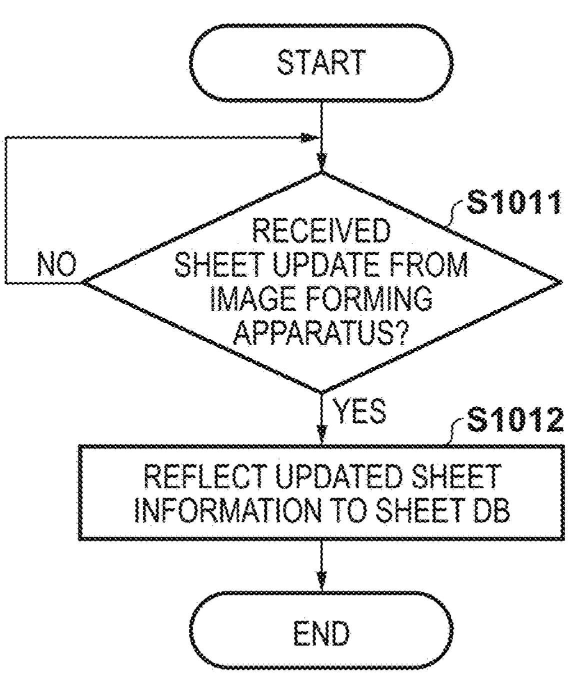
Figure 10C:
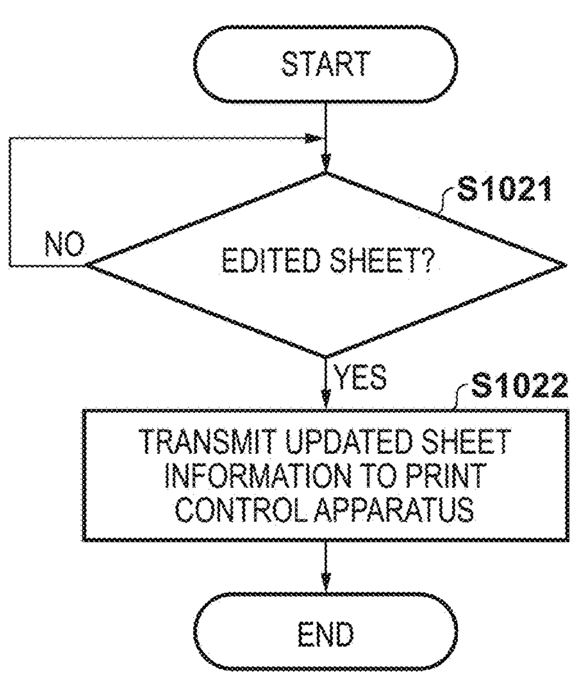
Figure 10D:
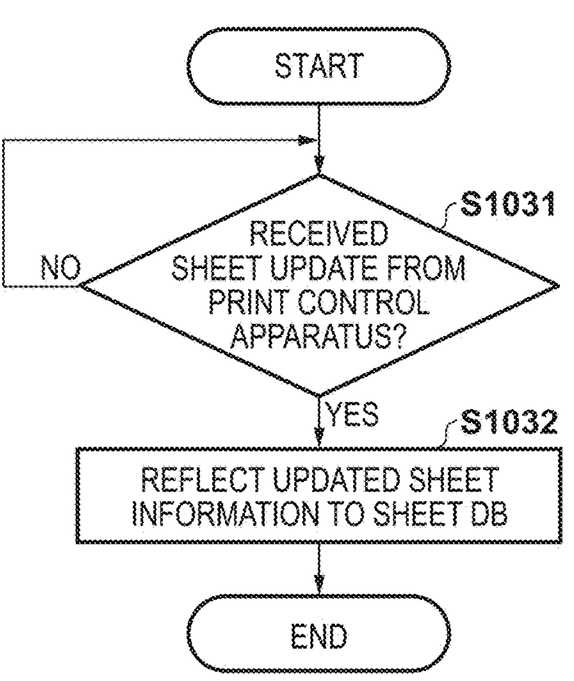

A flowchart shown in FIG. 10D represents processing of the image forming apparatus 0101 when synchronizing the sheet information between the print control apparatus 0109 and the image forming apparatus 0101 according to the first embodiment. The processing of this flowchart is implemented by, for example, reading out programs stored in the storage unit 0205 into the RAM 0202 and executing them by the CPU 0201 of the image forming apparatus 0101.

The flowchart of the image forming apparatus 0101 starts when the print control apparatus is powered on, and is repeated until the print control apparatus is powered off. Upon receiving, from the print control apparatus 0109 via the NW control module 0411 in step S1031 that the sheet information has been edited, the sheet information control module 0414 advances the process to step S1032. In step S1032, the sheet information control module 0414 accesses the sheet management table 0701 in the storage unit 0205, and reflects the update of the sheet information, thereby ending the processing.

Even if the sheet information is updated in the image forming apparatus 0101, the print control apparatus 0109 is notified of the updated contents by a flowchart shown in FIG. 10C. Then, the print control apparatus 0109 reflects the updated contents on the sheet management table 0701 by a flowchart shown in FIG. 10B. The flowcharts shown in FIGS. 10B and 10C are the same as the flowcharts shown in FIGS. 10D and 10A and a description thereof will be omitted.

Second Embodiment

The second embodiment of the present invention will be described next.

Job Property Screen of Print Control Apparatus

Figure 11:
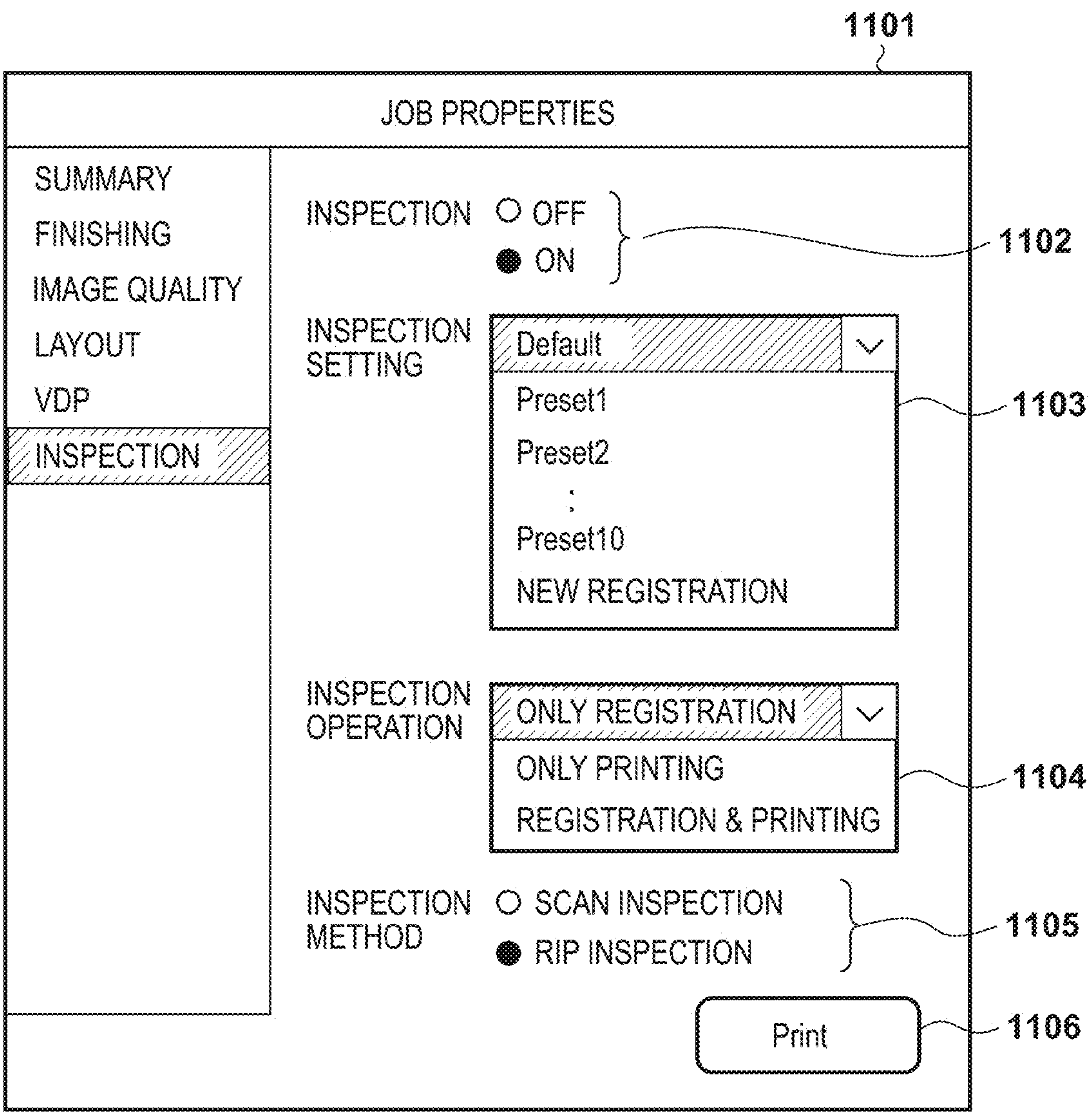
FIG. 11 is a view showing a job property screen of the print control apparatus and an information processing apparatus according to an embodiment.

FIG. 11 is a screen for designating an inspection mode in job properties in a print control apparatus 0109 according to the second embodiment. A job property screen 1101 is stored in a storage unit 0236. When an operator instructs inspection mode setting by operating a UI panel 0261, a printer control module 0403 instructs a UI control module 0432 to display the job property screen 1101 on the UI panel 0261. A region 1102 is a region for designating whether to perform inspection in an inspection apparatus 0108. A region 1103 is a region for designating an inspection setting. A region 1104 is a region for designating an inspection operation (execution of only reference image registration, execution of only printing, or execution of both registration and printing). A region 1105 is a region for designating which of inspection methods (scan inspection and RIP inspection) is executed. When the operator operates the UI panel 0261 to designates the respective regions 1102 to 1105, and operates a Print button 1106, the printer control module 0403 inputs a designated inspection job to an image forming apparatus 0101.

If the inspection method selected in the region 1105 is scan inspection, the image forming apparatus 0101 first prints a print job as an inspection target. A printed product obtained by printing a sheet by the image forming apparatus 0101 is captured by an inspection unit 0106 to generate image data. The image forming apparatus 0101 transmits the image data to the inspection apparatus 0108. The operator confirms that the image data displayed on the inspection apparatus 0108 includes no stain or character error, and registers the image data as a reference image. As described above, in a reference image registration method in scan inspection, image data obtained by scanning a printed product is registered as a reference image in the inspection apparatus 0108. Note that with respect to the reference image, images obtained by printing and capturing a plurality of copies in the image forming apparatus 0101 can be transmitted to the inspection apparatus 0108, and a combined image of the plurality of copies can be used as a reference image.

If the inspection method selected in the region 1105 is RIP inspection, the image forming apparatus 0101 transmits a generated RIP image to the inspection apparatus 0108. At this time, the RIP image may be a RIP image generated by a RIP apparatus (for example, RIP software or the like) other than the image forming apparatus 0101. As described above, in a reference image registration method in RIP inspection, a RIP image is registered as a reference image in the inspection apparatus 0108.

Job Input Processing of Print Control Apparatus

Figure 12:
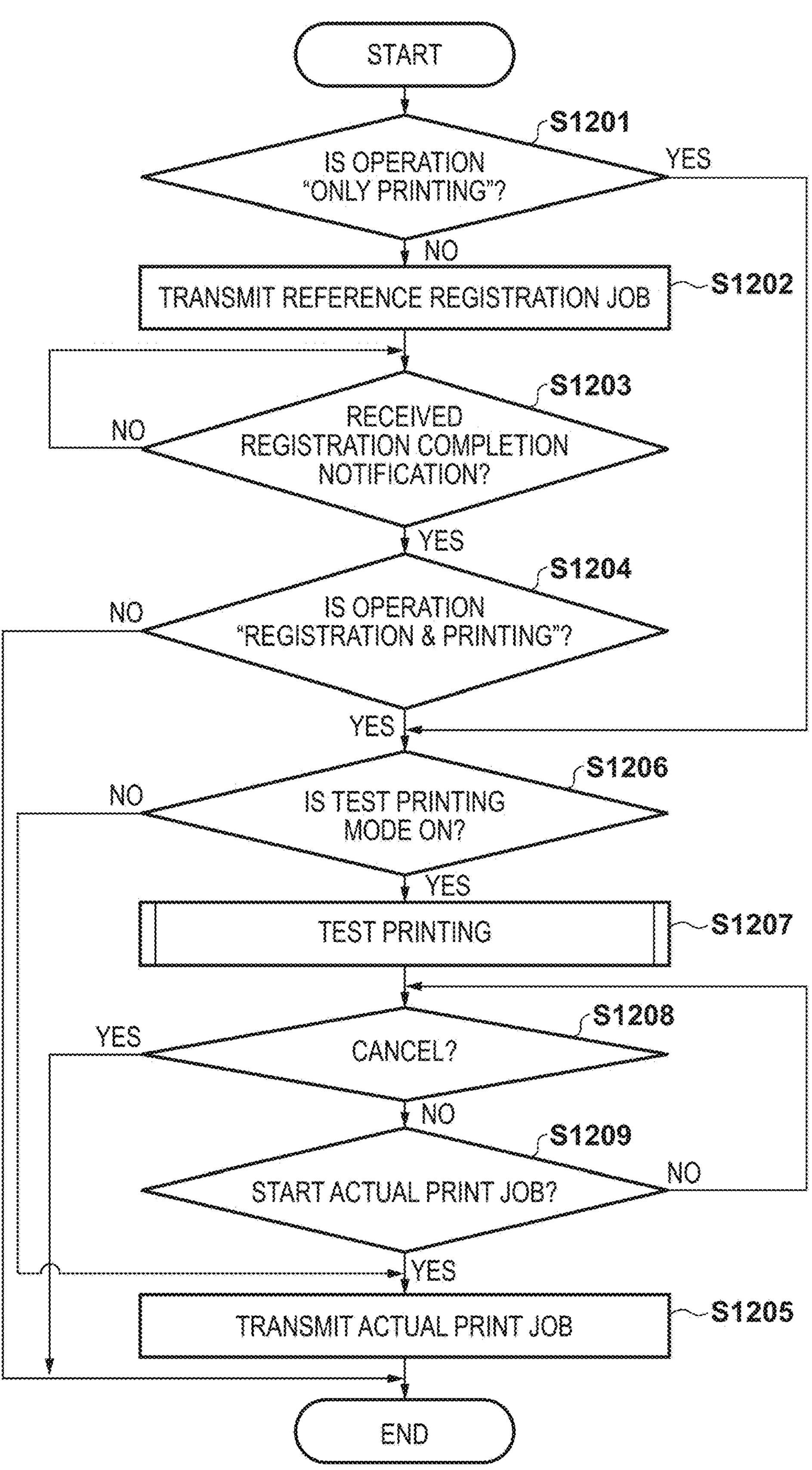
FIG. 12 is a flowchart of reference image registration and inspection job input of the print control apparatus according to the embodiment.

FIG. 12 is a flowchart of reference image registration and inspection job input in the print control apparatus 0109 according to the second embodiment. Processing to be described below is implemented by, for example, reading out programs stored in the storage unit 0236 into a RAM 0235 and executing them by a CPU 0234 of the print control apparatus 0109. Note that the flowchart represents a procedure common to scan inspection and RIP inspection.

The flowchart starts when the Print button 1106 is operated on the job property screen 1101. In step S1201, the printer control module 0403 confirms the operation set in the region 1104. If the operation is "only printing" (YES), the process advances to step S1206. If the operation is "only registration" or "registration & printing" in step S1201 (NO), the process advances to step S1202. In step S1202, the print control apparatus 0109 transmits a reference image registration job to the image forming apparatus 0101. At this time, sheet information used for each reference image is also transmitted to the image forming apparatus 0101. Then, the process advances to step S1203.

If "scan inspection" is selected in the region 1105 of the job property screen 1101, the printer control module 0403 transmits a print job of one copy or a plurality of copies to the image forming apparatus 0101. The image forming apparatus 0101 receives the print job, performs a print operation and image capturing, and then transmits a captured image to the inspection apparatus 0108.

If "RIP inspection" is selected in the region 1105 of the job property screen 1101, the printer control module 0403 transmits a RIP image as a reference image to the inspection apparatus 0108 without instructing printing in the image forming apparatus 0101. Then, the process advances to step S1203.

Upon receiving a reference image registration completion notification from the inspection apparatus 0108 via the NW control module 0401, the printer control module 0403 advances the process to step S1204.

In step S1204, the printer control module 0403 confirms the operation set in the region 1104 of the job property screen 1101. If the operation is "only registration", the process ends. If the operation is "registration & printing" in step S1204, the process advances to step S1206.

In step S1206, the printer control module 0403 confirms whether a test printing mode is ON. Processing when the test printing mode is ON (YES) will be described in the third embodiment. If the test printing mode is not ON (NO), the process advances to step S1205. In step S1205, the printer control module 0403 transmits the print job to the image forming apparatus 0101, and ends the processing.

This print job is transmitted after undergoing the same processing regardless of the selection of whether to perform inspection in the region 1102 of the job property screen 1101. When the print job is transmitted from the print control apparatus 0109 to the image forming apparatus 0101, the image forming apparatus 0101 performs a print operation, captures a printed sheet by an image capturing unit 0218, and then transmits a captured image to the inspection apparatus 0108. The inspection apparatus 0108 performs inspection by comparing the captured image of the printed product with the reference image.

Figures 13A, 13B:
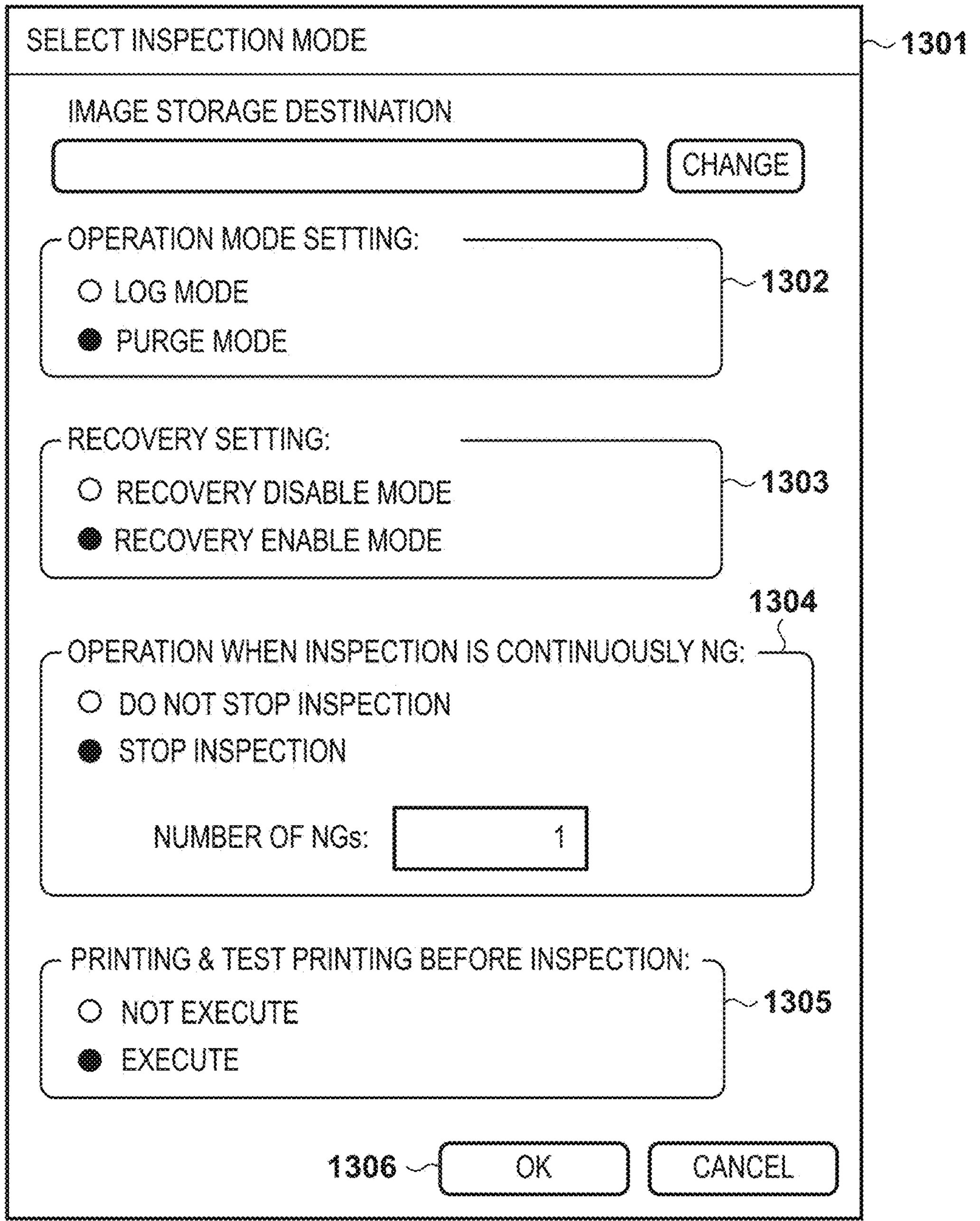
FIG. 13A is a view of an inspection setting UI of an inspection apparatus according to the embodiment.
FIG. 13B is a table showing an example of a table concerning an inspection NG type and corresponding adjustment.
Figure 17B:
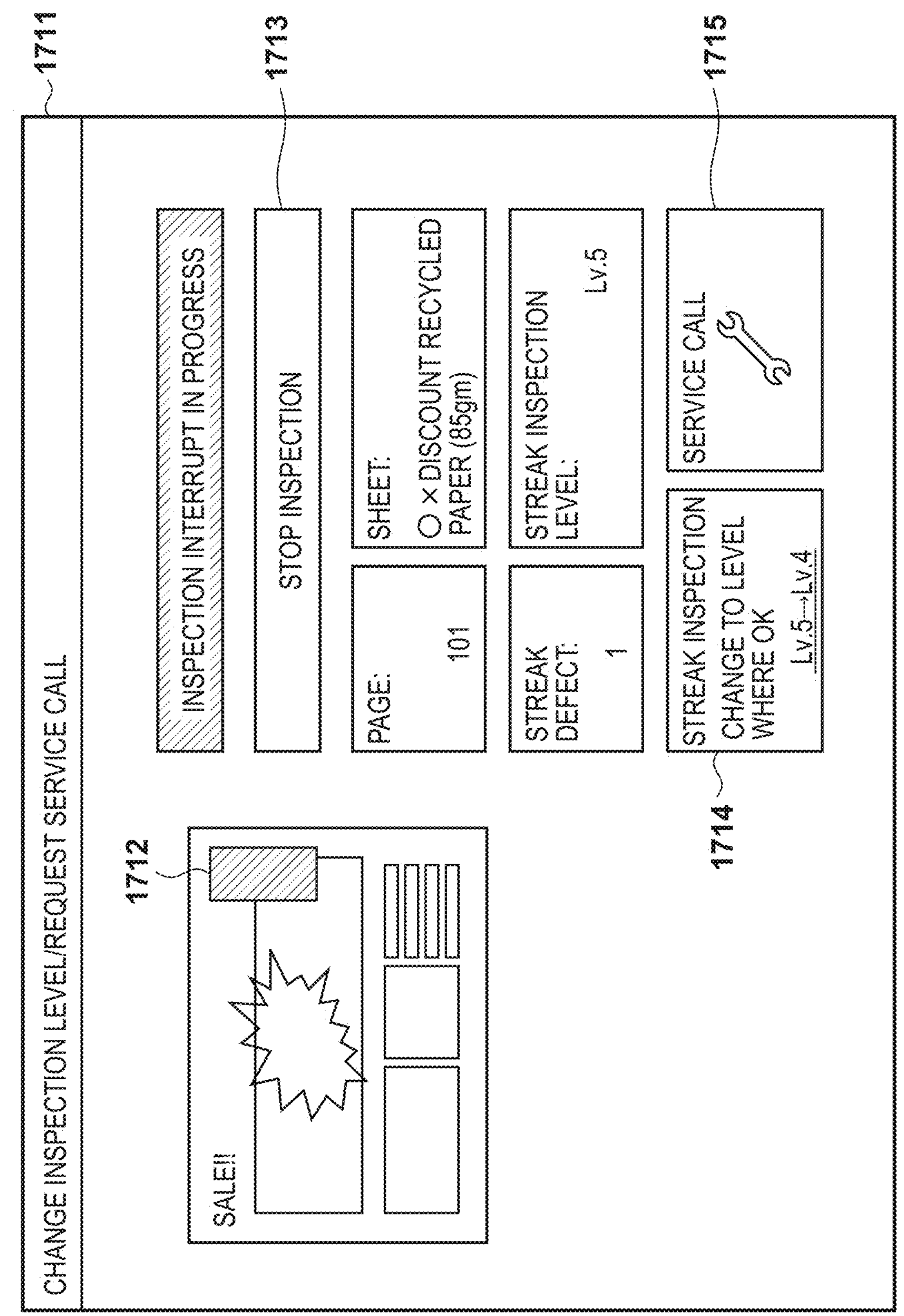

Operation Mode Setting of Inspection Apparatus and Recovery Processing in Case where Inspection is Continuously NG An inspection mode selection screen 1301 shown in FIG. 13A is a setting screen for designating an operation mode and an operation in a case where inspection is continuously NG in the inspection apparatus 0108 and the inspection unit 0106. The inspection mode selection screen 1301 is stored in a storage unit 0228. When a display unit 0245 is operated to instruct operation mode setting, an inspection control module 0424 instructs a UI control module 0422 to display the inspection mode selection screen 1301 on the display unit 0245.

An operation mode setting 1302 on the inspection mode selection screen 1301 accepts an operation mode setting by the operator. If "log mode" is selected, the image forming apparatus 0101 discharges the inspected sheet to a discharge destination designated in advance in the properties of the print job regardless of the inspection result of the inspection apparatus 0108. If "purge mode" is selected, the image forming apparatus 0101 discharges, to a top tray 0320, a sheet whose inspection result is NG.

A recovery setting 1303 on the inspection mode selection screen 1301 is reflected in a case where "purge mode" is selected in the operation mode setting 1302. If "recovery disable mode" is selected in the recovery setting 1303, the image forming apparatus 0101 discharges, to the top tray 0320, only a sheet whose inspection result is NG. The image forming apparatus 0101 and the inspection apparatus 0108 continue printing and inspection as usual for succeeding sheets.

If "recovery enable mode" is selected in the recovery setting 1303, the image forming apparatus 0101 discharges, to the top tray 0320, a sheet whose inspection result is NG and all succeeding sheets already fed in this apparatus when the inspection apparatus 0108 determines that the inspection result is NG. After that, when there is no sheet in the sheet conveyance path, the image forming apparatus 0101 and the inspection apparatus 0108 resume printing and inspection from an image to be printed on the sheet whose inspection result is NG.

An "operation when inspection is continuously NG" 1304 on the inspection mode selection screen 1301 accepts whether to stop printing/inspection when NG is continuously determined during inspection by the inspection apparatus 0108. If the operator operates the display unit 0245 to select "inspection stop", and inputs a numerical value to "NG sheet count", the inspection apparatus 0108 stops printing and inspection when inspection is continuously NG the number of times that is equal to the designated numerical value.

"Test printing before printing & inspection" 1305 on the inspection mode selection screen 1301 is a setting of test printing before the start of printing and inspection with respect to a sheet for which high inspection levels are set or a sheet that has not been inspected by the inspection apparatus 0108. This item accepts whether to use a function of confirming whether inspection is performed without any problem by printing and inspection before actual printing and inspection. An operation associated with this function will be described in the third embodiment.

When the operator performs the operation mode setting displayed on the inspection mode selection screen 1301, and operates the display unit 0245 to operate an OK button 1306, the UI control module 0422 instructs an inspection information storage module 0423 to record inspection setting information in the storage unit 0228. Furthermore, the print control apparatus 0109 is notified of information concerning the presence/absence of execution of test printing set in the "test printing before printing & inspection" 1305. Upon receiving this notification, the print control apparatus 0109 records the information concerning the presence/absence of execution of test printing in the RAM 0235.

A table 1311 shown in FIG. 13B is a table in which recovery processing corresponding to an NG item when inspection is continuously NG, which is set in the "operation when inspection is continuously NG" 1304, is described. The table 1311 is stored in the storage unit 0228. After inspection is continuously NG and printing and inspection stop, the inspection control module 0424 refers to the table 1311 to decide necessary recovery processing. For example, if the type of inspection NG is a positional deviation, the print start position in the image forming apparatus 0101 may deviate from the correct position. In this case, since inspection NG may be eliminated by performing registration adjustment, it is described that registration adjustment is executed as recovery processing. In addition, when a tint deviates from a reference, this may be detected as a streak stain in the inspection image. In this case, since inspection NG may be eliminated by calibration processing using the image forming apparatus 0101 and the print control apparatus 0109, it is described that calibration is executed as recovery processing.

Operation of Inspection Apparatus

Subsequently, the operation of the inspection apparatus 0108 will be described with reference to FIGS. 14 to 20.

FIG. 14 is a flowchart when the inspection apparatus 0108 executes an inspection job according to the second embodiment. The processing of this flowchart is implemented by, for example, reading out programs stored in the storage unit 0228 into a RAM 0227 and executing them by a CPU 0226 of the print control apparatus 0108.

This flowchart starts when the inspection apparatus accepts an inspection job. In step S1401, the inspection control module 0424 accesses the storage unit 0228 to confirm the inspection operation set in the region 1104 of the job property screen 1101. If the inspection operation is "only printing", the process advances to step S1409. If the inspection operation is "only registration" or "registration & printing", the process advances to step S1402.

Processing in step S1402 will be described with reference to a flowchart shown in FIG. 15. FIG. 15 is a flowchart of the inspection apparatus 0108 according to the second embodiment. The processing of this flowchart is implemented by, for example, reading out programs stored in the storage unit 0228 into the RAM 0227 and executing them by the CPU 0226 of the inspection apparatus 0108. This flowchart starts if the inspection operation is "only registration" or "registration & printing" (NO) in step S1401. Note that the flowchart shown in FIG. 15 is common to scan inspection and RIP inspection.

In step S1501, the inspection control module 0424 receives a reference image registration job start notification from the image forming apparatus 0101. Then, the process advances to step S1502. The inspection control module 0424 repeats steps S1502 to S1505 until the reference images of all sheets are stored in the storage unit 0228 of the inspection apparatus 0108. If the inspection method is scan inspection, an inspection unit I/F 0231 receives, from an inspection apparatus I/F 0215 of the inspection unit 0106, images scanned by CISs 0315 and 0316.

If the inspection method is RIP inspection, a RIP image generated by the image forming apparatus 0101 before printing is received from the inspection apparatus I/F 0215 of the inspection unit 0106. Then, the process advances to step S1504. In step S1504, the inspection control module 0424 saves the received image in the RAM 0227.

FIG. 20 shows a table that stores a use sheet, inspection items, and inspection levels for each of pages of reference images. The inspection control module 0424 assigns Page IDs to a table 2001 in order of scanning the reference images, and records, in a sheet column, sheet information used for each page received from the print control apparatus 0109. Furthermore, the inspection control module 0424 records, in an inspection level column, inspection level information linked with the sheet information used. Then, the process advances to step S1505. If loading of all images is complete in step S1505, the process ends.

Referring back to FIG. 14, the process advances to step S1403. In step S1403, the inspection control module 0424 accesses the storage unit 0228 to confirm the inspection operation set in the region 1103 of the job property screen 1101. If the inspection operation is "Default" or "Preset" (NO), the process advances to step S1413. If the inspection operation is "new" (YES), the process advances to step S1404.

Figure 19:
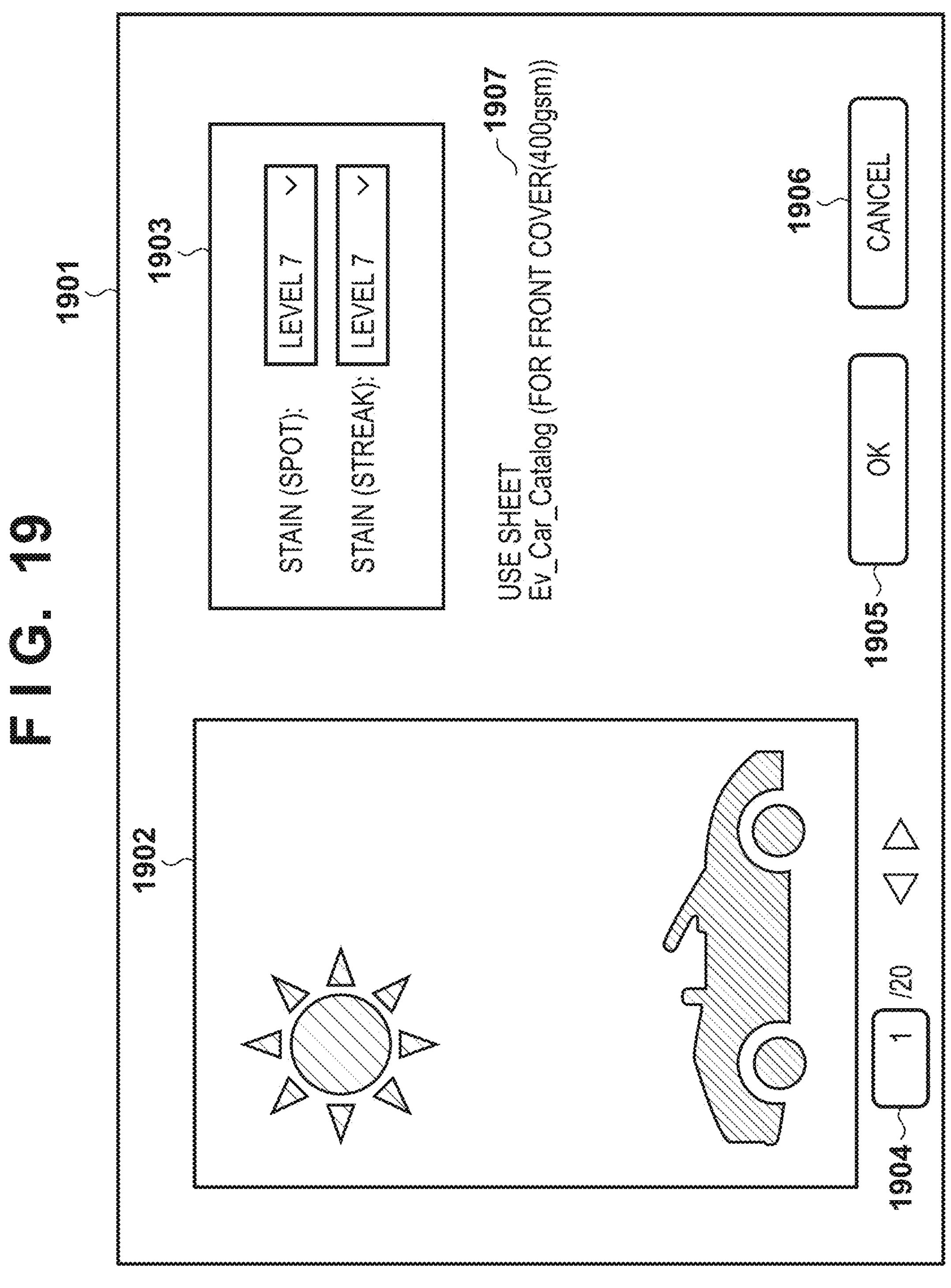
FIG. 19 is a view showing an example of an inspection level setting screen according to the embodiment.

In step S1404, the inspection control module 0424 acquires an inspection setting screen 1901 shown in FIG. 19 stored in the storage unit 0228. Then, the inspection control module 0424 instructs the UI control module 0422 to display the inspection setting screen 1901 on the display unit 0245. The process advances to step S1405. In step S1405, the inspection control module 0424 accesses the storage unit 0228 to confirm the inspection operation set in the region 1104 of the job property screen 1101.

If the inspection operation is "only registration", the process advances to step S1410. If the inspection operation is "registration & printing", the process advances to step S1406. In step S1406, acceptance of the inspection setting by the operator starts.

The inspection setting screen 1901 will now be described. A region 1902 is a preview region, in which a reference image generated by the flowchart shown in FIG. 15 is displayed. A region 1903 is an inspection level setting portion, in which an inspection level, that is, inspection accuracy can be set for each inspection item. As the inspection level is set higher, the inspection apparatus 0108 determines, as a defect, even a slight difference between the reference image and a printed product. The defect is exemplified as a circular defect (stain (spots)) or a streak defect (stain (streaks)).

When the reference image and a scan image of the printed product are compared with each other, a state in which a circular stain is generated only in the scan image of the printed product indicates a circular defect, and a state in which a streak or linear stain is generated only in the scan image of the printed product indicates a streak defect. These are merely examples and thus the defect type that can be detected by the inspection apparatus 0108 is not limited to them. A page number display portion 1904 can be used to switch a displayed image in a case where there are a plurality of reference images.

In a use sheet region 1907, a use sheet to be used to print this sheet is displayed. An OK button 1905 is a button used to register the inspection levels set in the region 1903 for the reference image. A cancel button 1906 is a button used to instruct to stop the inspection job. This screen is displayed to accept, from the operator, the inspection level for each inspection item with respect to each reference image saved in the inspection apparatus 0108.

If the operator operates the display unit 0245 to edit the inspection level for each inspection item shown in the region 1903, and then operates the OK button 1905, the inspection control module 0424 determines in step S1407 that the inspection setting is complete. After that, the inspection control module 0424 instructs an inspection information storage module 0423 to update the inspection levels in the table 2001. Furthermore, the inspection control module 0424 accesses the sheet management table 0701 to update the inspection levels liked with the sheet to be used. Then, the process advances to step S1408. In step S1408, the inspection control module 0424 transmits a registration completion notification to the print control apparatus 0109 via an NW control module 0421. Then, the process advances to step S1409.

Processing in step S1409 will be described with reference to a flowchart shown in FIGS. 16A and 16B.

FIGS. 16A and 16B is a flowchart of the inspection apparatus 0108 according to the second embodiment. The processing of this flowchart is implemented by, for example, reading out programs stored in the storage unit 0228 into the RAM 0227 and executing them by the CPU 0226 of the inspection apparatus 0108. This flowchart starts when the print control apparatus 0109 is notified of registration completion in step S1408.

In step S1601, the inspection control module 0424 accesses the storage unit 0228 to confirm the operation mode, the recovery setting, the operation when inspection is continuously NG, and the NG sheet count set on the inspection mode selection screen 1301. Then, the process advances to step S1602. In step S1602, the inspection control module 0424 accepts an image loading start instruction of this print job. Then, the process advances to step S1603.

The inspection control module 0424 repeats steps S1603 to S1618 until inspection of all the sheets is completed. The process advances to step S1604. In step S1604, the inspection control module 0424 receives, via the inspection unit I/F 0231 and the inspection apparatus I/F 0215, images scanned by the CISs 0315 and 0316, and records them in the RAM 0227. Then, the process advances to step S1605.

In step S1605, the inspection control module 0424 reads out, from the storage unit 0228, the image registered as the reference image in step S1504, and writes it in the RAM 0227. The process advances to step S1606. In step S1606, the images recorded in the RAM 0227 in steps S1604 and S1605 are compared with each other. In the comparison operation, feature points of the images are used as reference points for registration, and the reference image and the scan image as an inspection target are registered. Next, in the scan image as an inspection target, the four corners of the sheet and the registration reference points of the scan image are analyzed to detect whether the position of the image is deviated with respect to the sheet. Next, the density values of the reference image and the scan image as an inspection target are compared with each other for each pixel. If, as a result, no difference between the scan image and the reference image is detected, the inspection result is OK. If a difference is detected, the inspection result is NG, and details of the inspection result of NG are recorded in accordance with the type of the defect.

A screen for displaying a status during inspection in the inspection apparatus 0108 will be described with reference to FIG. 17A. FIG. 17A shows an inspection status screen displayed on the display unit 0245 at the time of executing inspection. An inspection status screen 1701 is stored in the storage unit 0228, and the UI control module 0422 displays the inspection status screen 1701 on the display unit 0245 based on an instruction of the inspection control module 0424.

On the inspection status screen 1701, execution/stop of inspection is accepted and an inspection status is displayed. An inspection button 1702 is used to accept execution of inspection/stop of inspection from the operator. When the inspection button 1702 is operated, a character string on the button is changed to "stop inspection", and an inspection status 1703 is changed to "inspecting". When the inspection button 1702 is operated once more, the character string on the button is changed to "start inspection", and the inspection status 1703 is changed to "stopping". After that, the character string on the inspection button 1702 and the inspection status 1703 are toggled every time the inspection button 1702 is operated.

On the inspection status screen 1701, the number of inspected sheets, the number of sheets whose inspection results are NG, a defective rate, and the number of times of occurrence of each cause for the inspection result of NG are displayed in real time during inspection. Note that a number in "error" on the inspection status screen 1701 indicates the number of times the inspection apparatus 0108 determines an error due to a time-out since inspection does not end within a predetermined inspection time and determines that the error corresponds to the inspection result of NG.

In an inspection NG list 1704, every time the inspection result is NG, a sheet number whose inspection result is NG, information indicating a front or rear surface, a cause for the inspection result of NG, inspection time, and a link to an NG detail screen are added. When "detail" is operated, the inspection control module 0424 instructs the UI control module 0422 to display, on the display unit 0245, a screen on which a captured image whose inspection result is NG, the position of a defect, and the like can be browsed.

The cause for the inspection result of NG is exemplified as a positional deviation, a circular defect (spots) or a streak defect (streaks). When the scan image and the reference image are compared with each other, a defect in which the entire image or part of the image is deviated indicates a positional deviation. A state in which a circular stain is generated only in the scan image indicates a circular defect. A state in which a streak or linear stain is generated only in the scan image indicates a streak defect. In this way, the inspection apparatus 0108 can specify the type of the detected defect from the feature of the defect, and display it in the inspection NG list 1704. Note that these are merely examples, and the defect types that can be detected by the inspection apparatus 0108 are not limited to them. For example, in a state in which an image is drawn only in the reference image and the entire image or part of it is not drawn in the scan image, a lack of an image is determined and added as the inspection result of NG.

The process returns to step S1606. If comparison between the images is complete in step S1606, the process advances to step S1607. If inspection is complete within a predetermined time in step S1607, the process advances to step S1608. If inspection is not completed within the predetermined time, the process advances to step S1611. This determination processing is executed because a succeeding sheet is delayed for scanning by the CISs 0315 and 0316 and the start of an operation of a scan image by the inspection unit I/F 0231 and the inspection apparatus I/F 0215 unless inspection is completed to output an inspection result within the predetermined time.

If the inspection result is NG (YES) in step S1608, the process advances to step S1609. In step S1609, the inspection control module 0424 accesses the RAM 0227 to confirm whether inspection of a previous page is OK or NG. If inspection of the previous page is OK or this inspection is inspection of the first page, the number of times of NG is set to 1. If the inspection of the previous page is NG, the recorded number of times of NG is incremented by one, and the obtained numerical value is stored in the RAM 0227. Then, the process advances to step S1610.

In step S1610, the inspection control module 0424 acquires the counter value of the number of continuous times of NG stored in the RAM 0227. Then, the NG sheet count set in the "operation when inspection is continuously NG" 1304 and recorded in the storage unit 0228 is acquired and compared with the counter value of the number of continuous times of NG. If both the values are equal to each other, it is determined that the NG sheet count set in the "operation when inspection is continuously NG" 1304 has been reached (YES), the process advances to step S1620. If both the values are not equal to each other, it is determined that the NG sheet count set in the "operation when inspection is continuously NG" 1304 has not been reached (NO), the process advances to step S1611.

In step S1611, the inspection control module 0424 accesses the storage unit 0228 to acquire the operation mode. If the operation mode is not "purge mode" (NO), the process advances to step S1617. If the operation is "purge mode" (YES), the process advances to step S1612. In step S1612, the inspection control module 0424 notifies the image forming apparatus 0101 of the inspection result of NG via the inspection unit I/F 0231 and the inspection apparatus I/F 0215. Then, the process advances to step S1613. In step S1613, the inspection control module 0424 accesses the storage unit 0228 to acquire the recovery setting. If the recovery setting is "recovery disable mode" (NO), the process advances to step S1616. If the recovery setting is "recovery enable mode" (YES), the process advances to step S1614.

If the inspection control module 0424 receives, in step S1614, printing stop information from the image forming apparatus 0101 via the inspection unit I/F 0231 and the inspection apparatus I/F 0215, the process advances to step S1615. In step S1615, the inspection control module 0424 reads out, from the RAM 0227, the reference image corresponding to the sheet whose inspection result is NG, and holds it as an image to be inspected next. Then, the process advances to step S1616. In step S1616, the inspection control module 0424 notifies the image forming apparatus 0101 of the resumption of inspection via the inspection unit I/F 0231 and the inspection apparatus I/F 0215. Then, the process advances to step S1617. In step S1617, the inspection control module 0424 adds, to the inspection NG list 1704, information about the sheet whose inspection result is NG, and instructs the UI control module 0422 to update the inspection status screen 1701. The process advances to step S1618.

Steps S1603 to S1618 are repeated until inspection of all the sheets ends. If inspection of all the sheets ends, the inspection control module 0424 advances the process to step S1619. In step S1619, the inspection control module 0424 instructs the UI control module 0422 to display information representing completion of inspection on the display unit 0245. Then, the process advances to step S1626. In step S1626, the inspection control module 0424 notifies, via the NW control module 0421, the print control apparatus 0109 and the image forming apparatus 0101 of information about the sheet having undergone inspection. The process then ends. Each of the print control apparatus 0109 and the image forming apparatus 0101 accesses the sheet management table 0701 stored in the self-apparatus to update inspection history information of the sheet.

Referring back to step S1610, if the number of sheets for which inspection is continuously NG reaches the predetermined number (YES) in step S1610, the process advances to step S1620. In step S1620, the inspection control module 0424 instructs, via the NW control module 0421, the image forming apparatus 0101 to interrupt printing. Then, the process advances to step S1621. If the inspection control module 0424 receives printing stop information from the image forming apparatus 0101 in step S1621, the process advances to step S1622.

In step S1622, the inspection control module 0424 accesses the RAM 0227 to confirm an item for which inspection is NG. The inspection control module 0424 accesses the table 1311 to confirm whether there is recovery processing for the item for which inspection is NG. If there is no recovery processing for the item for which inspection is NG, or all recovery processes have been executed, the process advances to step S1624. If there is recovery processing for the item for which inspection is NG (YES), the process advances to step S1623. In step S1623, the inspection control module 0424 executes the selected recovery processing. If, for example, the item for which inspection is NG is "positional deviation (vertical)", "registration adjustment" is selected as recovery processing corresponding to the item. If "registration adjustment" is selected, the inspection control module 0424 instructs the image forming apparatus 0101 to execute "registration adjustment". The process advances to step S1615, and the sheet for which inspection is NG is printed and inspected again to confirm whether inspection is NG. The subsequent processes have been explained above and a description thereof will be omitted.

Referring back to step S1622, if the inspection control module 0424 confirms in step S1622 that there is no recovery processing for the item for which inspection is NG or all the recovery processes have been executed (NO), the process advances to step S1624. Processing in step S1624 will be described with reference to a flowchart shown in FIG. 18.

Figure 18:
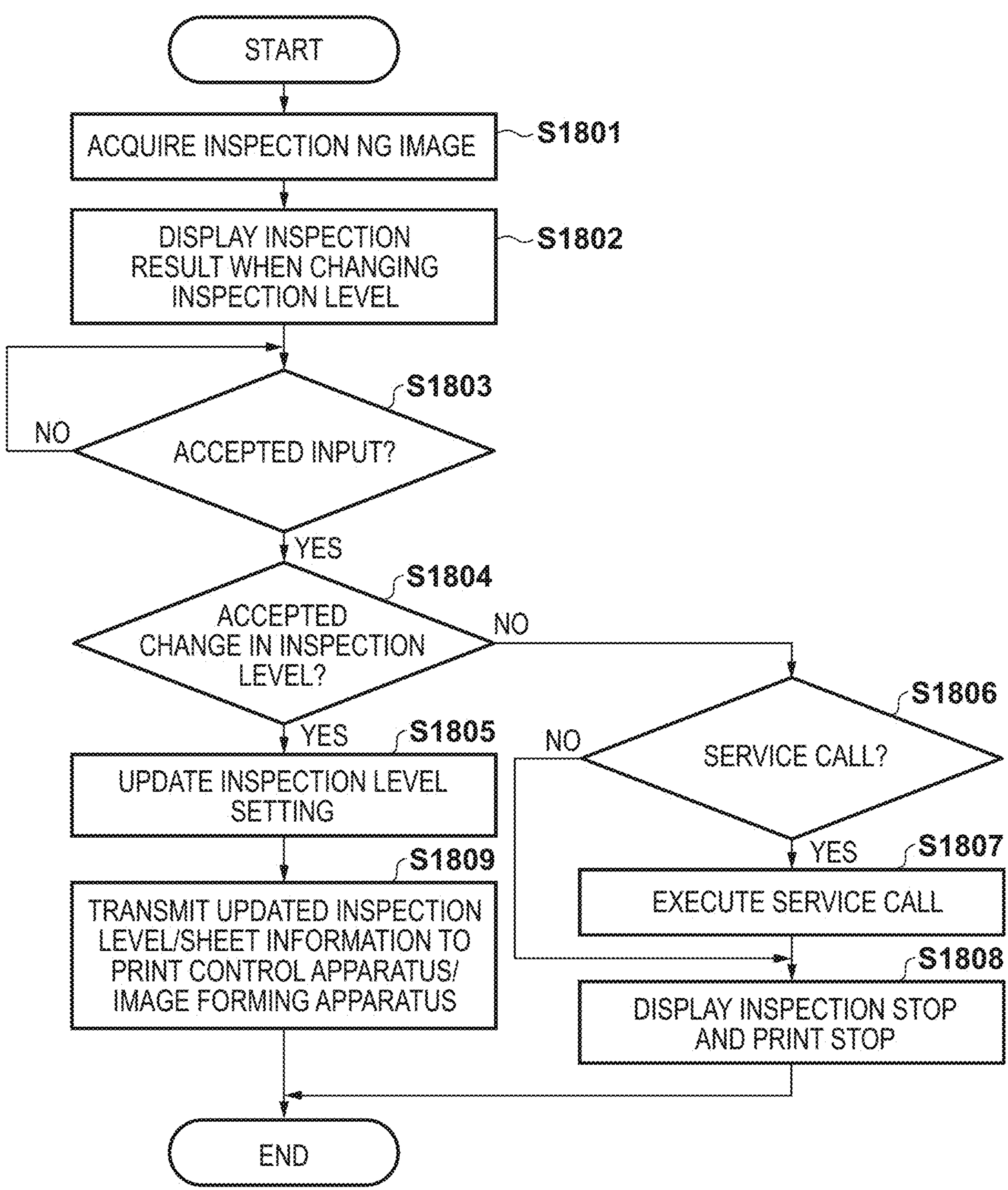
FIG. 18 is a flowchart for determining whether it is necessary to change the inspection level of the inspection apparatus according to the embodiment.

FIG. 18 is a flowchart of the inspection apparatus 0108 according to the second embodiment. The processing of this flowchart is implemented by, for example, reading out programs stored in the storage unit 0228 into the RAM 0227 and executing them by the CPU 0226 of the inspection apparatus 0108. This flowchart starts when it is determined in step S1622 that there is no recovery processing for NG.

In step S1801, the inspection control module 0424 accesses the RAM 0227 to acquire an inspection image. Then, the process advances to step S1802. In step S1802, the inspection control module 0424 acquires an inspection level change/service call request screen shown in FIG. 17B from the storage unit 0228. Furthermore, the inspection control module 0424 performs inspection for the NG image acquired in step S1801 in a state in which the inspection level of the NG portion is lowered, and calculates the inspection level at which inspection is OK. The inspection control module 0424 instructs the UI control module 0422 to display, on the display unit 0245, an inspection level change/service call request screen 1711 including the NG image and the calculation result. Then, the process advances to step S1803.

After that, the operator compares the NG portion displayed in a portion 1712 of the screen 1711 while viewing the print sheet for which it is determined that inspection is NG, and determines whether to accept the inspection result of NG. For example, if the operator determines that the inspection result of NG is excessive detection caused by the inspection level higher than an expected inspection level, the operator selects a button 1714 so inspection is not NG in subsequent inspection. Alternatively, if it is determined not to allow the fact that the inspection is NG, the operator selects a button 1715. If the operator wants to stop inspection, he/she selects a button 1713.

If any operator operation is accepted, the inspection control module 0424 advances the process to step S1804. In step S1804, the inspection control module 0424 confirms whether the processing accepted in step S1803 is processing of changing the inspection level. If the accepted processing is processing of changing the inspection level (YES), the process advances to step S1805. In step S1805, the inspection control module 0424 performs processing of changing the inspection level of the image for which inspection is NG. Furthermore, the inspection control module 0424 specifies a sheet used to print the image for which inspection is NG, and accesses the sheet management table 0701 to update the inspection level linked with the corresponding sheet to the updated inspection level. Then, the process advances to step S1809. In step S1809, the inspection control module 0424 notifies, via the NW control module 0421, the print control apparatus 0109 and the image forming apparatus 0101 of information concerning the sheet for which the inspection level has been updated. The process then ends. Each of the print control apparatus 0109 and the image forming apparatus 0101 accesses the sheet management table 0701 stored in the self-apparatus to update the inspection level of the corresponding sheet.

Referring back to step S1804, if the inspection control module 0424 determines, in step S1804, that the processing accepted in step S1803 is not processing of changing the inspection level (NO), the process advances to step S1806. In step S1806, the inspection control module 0424 confirms whether the processing accepted in step S1803 is a service call. If the accepted processing is not a service call (NO), the process advances to step S1808. If the accepted processing is a service call (YES), the process advances to step S1807. In step S1807, the inspection control module 0424 notifies a call center registered in advance that a defect in print quality exists and is not solved even by executing recovery processing prepared in advance. Then, the process advances to step S1808.

In step S1808, the inspection control module 0424 instructs the image forming apparatus 0101 to cancel inspection being executed and printing being stopped, and ends the processing. Referring back to FIGS. 16A and 16B, the process advances to step S1625.

In step S1625, the inspection control module 0424 confirms whether a resumption instruction is sent by changing the inspection level. If a resumption instruction is sent by changing the inspection level (YES), the process advances to step S1616. If it is determined that an instruction to resume printing is not sent by changing the inspection level (NO), the process advances to step S1619. The subsequent processes have been explained above and a description thereof will be omitted.

Referring back to step S1405 of FIG. 14, if the inspection operation is "only registration" in step S1405 (NO), the process advances to step S1410. Subsequent processes are steps S1410, S1411, and S1412, but details thereof have been explained in steps S1406 to S1408 and a description hereof will be omitted.

Referring back to step S1403, if the inspection operation is "Default" or "Preset" in step S1403 (NO), the process advances to step S1413. The inspection setting "Preset" indicates a function of recording, in advance, a combination of inspection levels for respective inspection items often used by the operator. For example, "Preset 1" is selected in the inspection setting of the job property screen 1101, and a job is input from the print control apparatus 0109. In step S1413, the inspection control module 0424 reads out inspection level information for inspection items of Preset 1 from the storage unit 0228, and reflects the information on the inspection level information of the reference image.

The fact that the inspection operation is "Default" indicates that the inspection levels linked with the sheet used to print the reference image are applied. More specifically, the reference image is inspected using the information stored in the table 2001. For example, for the Page ID "0001" in the table 2001, it is recorded that a sheet "EV_Car_Catalog (for front cover)" is used and this page is inspected at the inspection level "7" with respect to the inspection item (stain (spots)) and the inspection item (stain (streaks)). As described above, if the inspection operation is "Default", the inspection levels linked with the sheet used are automatically assigned for each page in an input print job, and each page is inspected.

After confirming inspection information necessary for each inspection operation, the inspection control module 0424 advances the process to step S1414. Processing in step S1414 has been explained in steps S1408 and S1412 and a description thereof will be omitted. Then, the process advances to step S1415. In step S1415, the inspection control module 0424 accesses the storage unit 0228 to confirm the inspection operation set in the region 1104 of the job property screen 1101. If the inspection operation is "only registration" (NO), the process ends. If the inspection operation is "registration & printing" (YES), the process advances to step S1409. The subsequent processes have been explained above and a description thereof will be omitted.

Third Embodiment

Method of Determining Whether to Apply Inspection Level Assigned to Existing Sheet from Similar Name The third embodiment of the present invention will be described next.

Figure 21:
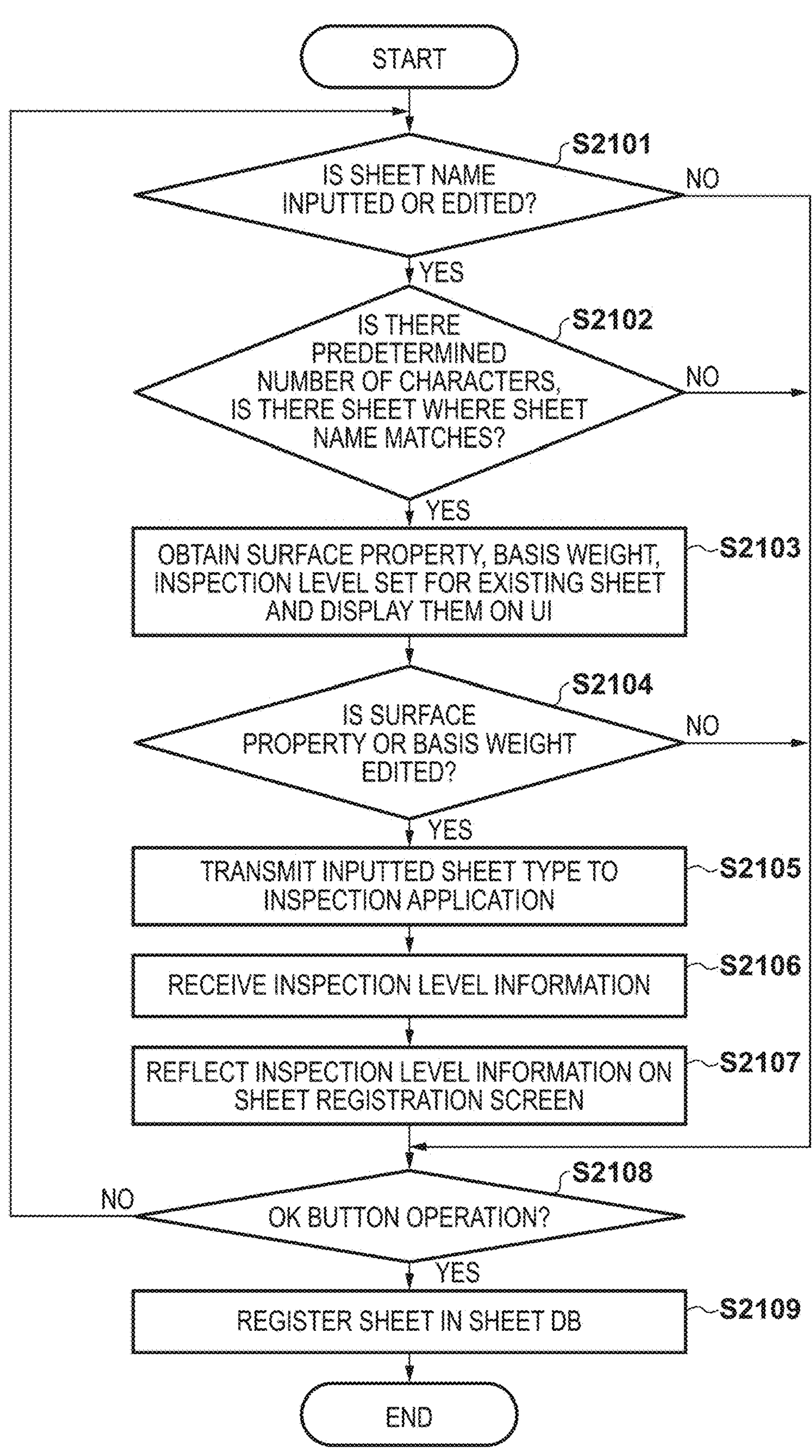
FIG. 21 is a flowchart for determining whether to apply an inspection level assigned to an existing sheet from a similar name according to an embodiment.

FIG. 21 is a flowchart associated with a method of determining whether to apply an inspection level assigned to a registered existing sheet from a similar name input to a sheet name field in a print control apparatus 0109 according to the third embodiment. The processing of this flowchart is implemented by, for example, reading out programs stored in a storage unit 0236 into a RAM 0235 and executing them by a CPU 0234 of the print control apparatus 0109. The flowchart of the print control apparatus 0109 starts when the operator operates a UI panel 0261 to issue a sheet registration instruction, and then a UI control module 0402 acquires an input screen 0601 from the storage unit 0236 and displays it on the UI panel 0261.

If the operator operates the UI panel 0261 to input a sheet name to a region 0602 as a sheet name field, a sheet information control module 0404 advances the process to step S2102. In step S2102, the sheet information control module 0404 accesses a sheet management table 0701 to search a registered sheet name column, and confirms the presence/absence of a sheet name having a character string similar to the character string input to the region 0602. As a unit for determining whether the character strings are similar to each other, for example, if "flyer" described at the beginning of the sheet name "FLYER_ABC_SUPERMARKET" of a sheet ID "0001" matches "flyer" at the beginning of the sheet name input to the region 0602, it may be determined that the character strings are similar to each other. Alternatively, if there are portions of the character strings which match each other with respect to a predetermined number of characters not at the beginning of the character string but in the middle of the character string, it may be determined that the character strings are similar to each other. A method of determining a match between character strings and a method of determining similarity between character strings are not particularly limited.

The sheet information control module 0404 determines, in step S2102, that there is an existing sheet for which the predetermined number of characters of the sheet name match, the process advances to step S2103. In step S2103, the sheet information control module 0404 accesses the sheet management table 0701 to acquire a medium type (surface property), a medium type (basis weight (gsm)), and inspection level information set for the existing sheet whose sheet name is determined to be similar. After that, the sheet information control module 0404 instructs the UI control module 0402 to display the acquired information on a UI panel 0203, and advances the process to step S2104. At this time, if the operator operates the UI panel 0203 to edit a region 0603 of a medium type (surface property) input field, a region 0604 of a medium type (basis weight (gsm)) input field, or both of them, the process advances to step S2105.

Subsequent processes are steps S2105, S2106, S2107, and S2108, but details thereof have been explained in steps S0804, S0805, and S0806 in the flowchart shown in FIG. 8A and a description hereof will be omitted. If the operator operates an OK button 0609, the UI control module 0402 advances the process to step S2109. Processing in step S2109 has been explained in step S0808 in the flowchart shown in FIG. 8A and a description thereof will be omitted. The process then ends.

Method of Determining Whether to Execute Test Printing in Case where Job is Input FIG. 22A is a flowchart of an inspection apparatus 0108 according to the third embodiment. The processing of this flowchart is implemented by, for example, reading out programs stored in a storage unit 0228 into a RAM 0227 and executing them by a CPU 0226 of the print control apparatus 0108. This flowchart starts when "test printing before printing & inspection" 1305 of an inspection mode selection screen 1301 is "execution" before performing printing and inspection in step S1409 of FIG. 14.

In step S2201, an inspection control module 0424 accesses a table 0501 to confirm a default level for each inspection item. Then, the inspection control module 0424 accesses a table 2001 to confirm whether there is a sheet for which an inspection level exceeding the default level is set among sheets used in inspection. If there is a corresponding sheet (YES), the process advances to step S2202. In step S2202, the inspection control module 0424 records, in the RAM 0227, the sheet selected in step S2201. Then, the process advances to step S2203.

In step S2203, the inspection control module 0424 accesses the table 2001 to select a sheet to be used in inspection. After that, the inspection control module 0424 inquires, via an NW control module 0421, of the print control apparatus 0109 about whether there is an inspection history for the sheet to be used in inspection. The process advances to step S2204. In step S2204, the inspection control module 0424 receives a result of the inquiry from the print control apparatus 0109 via the NW control module 0421. Then, the process advances to step S2205. In step S2205, based on the result received from the print control apparatus 0109 in step S2204, the inspection control module 0424 determines whether a sheet to be used by the inspection apparatus for the first time is included. If a sheet to be used by the inspection apparatus for the first time is included, the process advances to step S2206.

Figure 23:
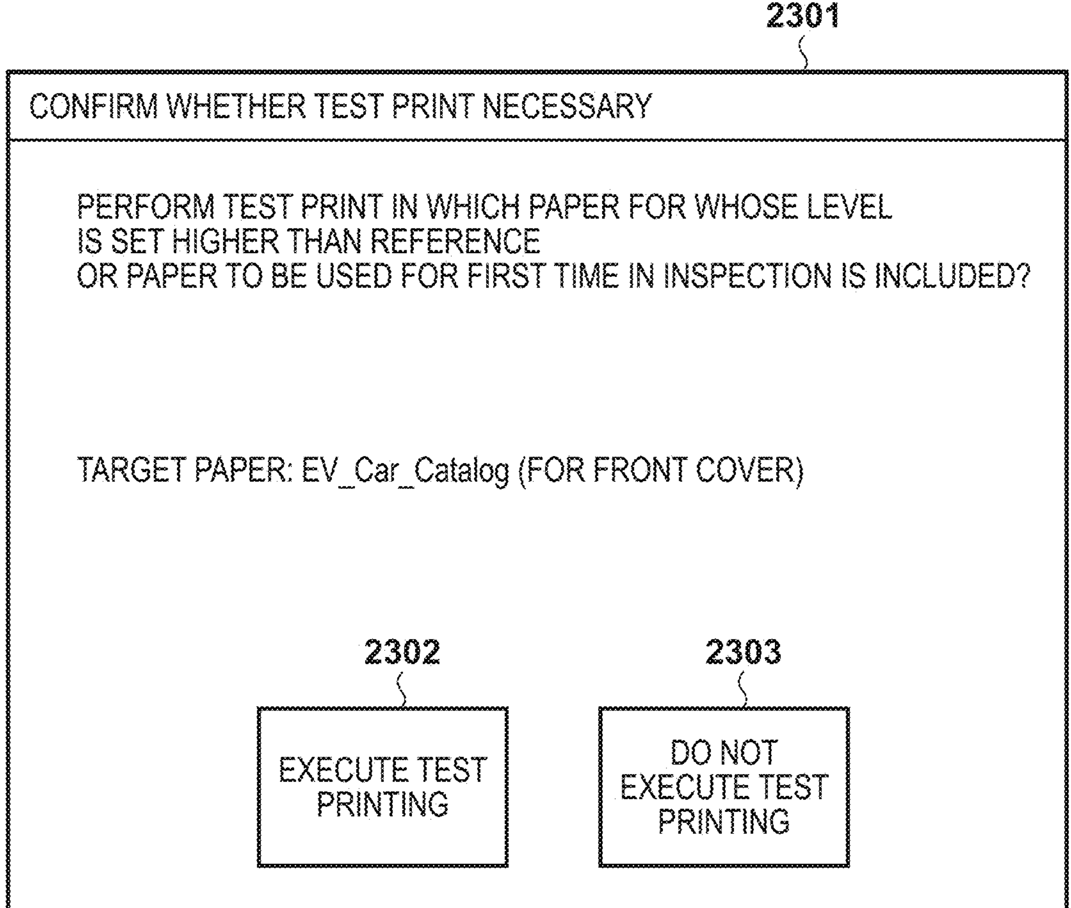
FIG. 23 is a view showing an example of a test printing necessity confirmation screen according to the embodiment.

In step S2206, the inspection control module 0424 records, in the RAM 0227, the sheet information received from the print control apparatus 0109 in step S2204. Then, the process advances to step S2207. In step S2207, the inspection control module 0424 accesses the RAM 0227 to confirm the presence/absence of a sheet for which an inspection level higher than a reference is set or a sheet to be used in inspection for the first time. If there is a corresponding sheet (YES), the process advances to step S2208. In step S2208, the inspection control module 0424 accesses the RAM 0227 to acquire corresponding sheet information in step S2207, acquires a test printing necessity confirmation screen 2301 shown in FIG. 23 from the storage unit 0228, and instructs a UI control module 0422 to display the test printing necessity confirmation screen 2301 on a display unit 0245. The operator views the display unit 0245 and selects whether to execute test printing. When the operator operates a button 2302 for executing test printing or a button 2303 for not executing test printing, the UI control module 0422 advances the process to step S2209.

In step S2209, the inspection control module 0424 confirms the button operated by the operator in step S2208. If the button 2302 for executing test printing has been operated, the process advances to step S2210. In step S2210, the inspection control module 0424 accesses the RAM 0227 to select a Page ID linked with the sheet as a test target. Then, the inspection control module 0424 transmits the selected Page ID to the print control apparatus 0109 via the NW control module 0421. Then, the process advances to step S2211. In step S2211, the inspection control module 0424 loads an image obtained by inputting a job from the print control apparatus 0109 and performing printing and scanning by the image forming apparatus 0101, and sent to the inspection apparatus 0108, and compares the image with a reference image. The process then ends.

Figure 22B:
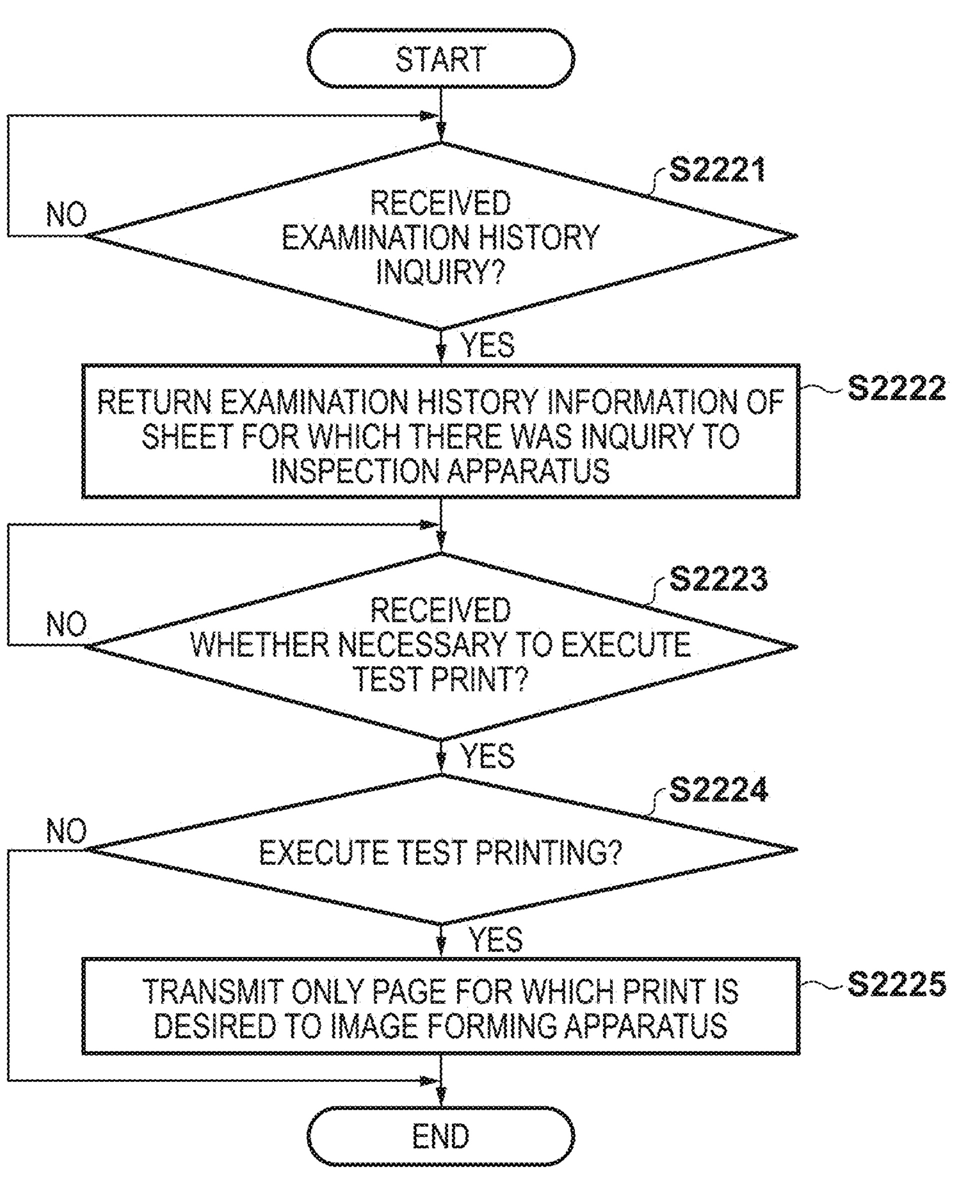
FIG. 22B is a flowchart of a print control apparatus that decides, in a case where a high inspection level is set or a case where a sheet is used for the first time, whether to execute test printing using only that sheet.

FIG. 22B is a flowchart of the print control apparatus 0109 according to the third embodiment. The processing of this flowchart is implemented by, for example, reading out programs stored in the storage unit 0236 into the RAM 0235 and executing them by the CPU 0234 of the print control apparatus 0109. When it is determined in step S1206 of FIG. 12 that the test printing mode is ON, this flowchart starts in step S1207.

Upon receiving an inquiry about the presence/absence of an inspection history of a sheet from the inspection apparatus 0108 in step S2221, the sheet information control module 0404 advances the process to step S2222. In step S2222, the sheet information control module 0404 accesses the sheet management table 0701 to acquire the inspection history of the sheet about which the inquiry has been received, and transmits the information to the inspection apparatus 0108 via the NW control module 0401. Then, the process advances to step S2223. Upon receiving test printing execution necessity information from the inspection apparatus 0108 via an NW control module 0431, a printer control module 0403 advances the process to step S2224. If it is determined in step S2224 that the test printing execution necessity information received in step S2223 indicates the presence of execution (YES), the printer control module 0403 advances the process to step S2225. In step S2225, the printer control module 0403 selects a page necessary for printing from a Page ID linked with the test execution presence/absence information in step S2223, and transmits only the corresponding page to the image forming apparatus 0101, thereby ending the processing.

Processing in which Inspection Apparatus Specifies Sheet Type of Sheet to be Used and Decides Inspection Level at Start of Printing & Inspection without Holding Inspection Level for Sheet to be Used Each of the first and second embodiments has explained the reference image registration by linking inspection information with a sheet, and the printing and inspection method. Without linkage with the sheet DB of the print control apparatus 0109 or the image forming apparatus 0101, an inspection level may be specified from sheet information of a sheet to be used when the inspection apparatus 0108 performs inspection. In this case, the inspection control module 0424 of the inspection apparatus 0108 acquires, from the print control apparatus 0109, a sheet type such as the surface property of a sheet linked with sheet information used by each page and the basis weight of the sheet. Then, the inspection control module 0424 calculates the inspection level of the sheet type of the sheet from the tables 0501, 0502, and 0503, and performs inspection in step S1606 of FIG. 16A.

Case where Inspection Level Information Linked with Sheet Type is Held in Cloud Server The tables 0502 and 0503 indicating information concerning an inspection level linked with a sheet type may be held in the cloud server 0111. In this case, the print control apparatus 0109 or the inspection apparatus 0108 acquires a sheet type such as the surface property of a sheet linked with sheet information used by each page and the basis weight of the sheet, and requests, of the cloud server 0111, inspection level information linked with the sheet type. The cloud server 0111 calculates the inspection level of the sheet from the tables 0501 and 0502, and transmits the inspection level to the print control apparatus 0109 or the inspection apparatus 0108. After that, the print control apparatus 0109 or the inspection apparatus 0108 performs inspection in step S1606 of FIG. 16A.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-017436, filed Feb. 7, 2024 which is hereby incorporated by reference herein in its entirety.

What is claimed is:

1. An inspection apparatus comprising:
- one or more memory devices that store a set of instructions; and
- one or more processors that execute the set of instructions to:
  - detect a defect of an image formed by scanning, by a scan unit, a sheet with an image formed thereon conveyed from an image forming unit; and
  - determine an inspection level based on obtained sheet management information that links sheet information of the scanned sheet, wherein:
    - the sheet information identifies a sheet type of the scanned sheet and define at least one inspection level associated with the sheet type.

2. The inspection apparatus according to claim 1, wherein the sheet information includes a surface property a basis weight of the sheet type of the scanned sheet.

3. The inspection apparatus according to claim 2, wherein the at least one inspection level included in the sheet information is generated based on a standard inspection level and an adjustment value for the standard inspection level according to the sheet type.

4. The inspection apparatus according to claim 1, wherein the sheet information includes the inspection level for each of a front surface and a rear surface of the sheet type of the scanned sheet.

5. The inspection apparatus according to claim 1, wherein the sheet management is a table stored in a storage unit of at least one of the inspection apparatus, a printing control apparatus, or an image forming apparatus connected to the inspection apparatus.

6. The inspection apparatus according to claim 1, wherein:

image formation by the image forming unit is stopped at the time of detecting a defect, and in a case where the image forming unit provides recovery processing for the defect, the image forming unit is caused to execute the recovery processing and to resume the stopped image formation.

7. The inspection apparatus according to claim 6, wherein in a case where the image forming unit does not provide the recovery processing for the defect, a display device is caused to display an inspection result obtained by lowering the inspection level.

8. The inspection apparatus according to claim 7, wherein in a case where an operator instructs to change the inspection level, detection of a defect in the inspection is resumed at the changed inspection level.

9. The inspection apparatus according to claim 8, wherein in a case where the inspection level is changed, an inspection level of sheet information linked with the changed inspection level is updated.

10. The inspection apparatus according to claim 1, wherein:

the defect of the image is detected by comparing the formed image with a reference image including no registered defect, and in a case where an inspection level is designated for the reference image, sheet information of a sheet on which the reference image is formed is specified, and an inspection level of the specified sheet information is updated.

11. The inspection apparatus according to claim 1, wherein in a case where a character string of an input sheet name is similar to a character string of a sheet name of registered sheet information at a time of registering sheet information, an inspection level linked with the sheet information of the similar registered sheet name is set as an inspection level of the sheet information of the input sheet name.

12. The inspection apparatus according to claim 1, wherein in a case where at a time of instructing standard inspection, an image forming job using a sheet of sheet information whose inspection level is higher than the standard inspection is selected, an operator is caused to select whether it is necessary to execute test printing for a page using the sheet of the sheet information whose inspection level is higher than the standard inspection.

13. An image forming apparatus comprising:

an image forming unit configured to form an image on a sheet;

a scan unit configured to scan the sheet with the image formed thereon;

one or more memories configured to store sheet management information for linking a sheet type and an inspection level; and the inspection apparatus according to claim 1.

14. An inspection apparatus comprising:

one or more memory devices that store a set of instructions; and one or more processors that execute the set of instructions to:

detect a defect of an image formed by scanning, by a scan unit, a sheet with an image formed thereon conveyed from an image forming unit; and specify sheet information of a sheet to be used to perform image formation and inspection, and decide an inspection level based on a sheet type of the sheet information.

15. An inspection method comprising:

detecting a defect of an image formed by scanning, by a scan unit, a sheet with an image formed thereon conveyed from an image forming unit; and determining an inspection level based on obtained sheet management information that links sheet information of the scanned sheet, wherein:

the sheet information identifies a sheet type of the scanned sheet and defines at least one inspection level associated with the sheet type.

* * * * *